(12) United States Patent
Akase

(10) Patent No.: US 8,943,585 B2
(45) Date of Patent: Jan. 27, 2015

(54) ACCESS MONITORING METHOD, INFORMATION PROCESSING APPARATUS, AND COMPUTER-READABLE MEDIUM STORING ACCESS MONITORING PROGRAM

(75) Inventor: Masahide Akase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/458,503

(22) Filed: Apr. 27, 2012

(65) Prior Publication Data
US 2012/0311669 A1  Dec. 6, 2012

(30) Foreign Application Priority Data

Jun. 2, 2011  (JP) .................................. 2011-124397

(51) Int. Cl.
*H04L 29/06* (2006.01)
*G06F 21/55* (2013.01)
*H04L 12/58* (2006.01)

(52) U.S. Cl.
CPC ............ *H04L 63/102* (2013.01); *H04L 63/083* (2013.01); *H04L 63/18* (2013.01); *G06F 21/554* (2013.01); *H04L 12/585* (2013.01)
USPC ...................... 726/22; 726/3; 726/24; 726/26

(58) Field of Classification Search
CPC .. H04L 63/1483; H04L 63/14; H04L 63/1433
USPC ......... 709/206, 229; 713/182; 726/3, 4, 7, 24, 726/28
See application file for complete search history.

(56) References Cited

U.S. PATENT DOCUMENTS

| | | | |
|---|---|---|---|
| 6,529,956 B1* | 3/2003 | Smith et al. .................... | 709/229 |
| 7,802,295 B2 | 9/2010 | Murase et al. | |
| 2002/0143629 A1* | 10/2002 | Mineyama et al. ............. | 705/14 |
| 2007/0006305 A1* | 1/2007 | Florencio et al. ............... | 726/22 |
| 2007/0039038 A1* | 2/2007 | Goodman et al. ................ | 726/2 |
| 2009/0077637 A1* | 3/2009 | Santos et al. ..................... | 726/5 |

(Continued)

FOREIGN PATENT DOCUMENTS

| | | |
|---|---|---|
| JP | 2002-91917 A | 3/2002 |
| JP | 2002-288134 A | 10/2002 |

(Continued)

OTHER PUBLICATIONS

Kumaraguru et al., Teaching Johnny Not to Fall for Phish, May 2010.*
JPOA—Office Action mailed Oct. 7, 2014 for corresponding Japanese Application No. 2011-124397, with English translation of relevant part: p. 1 line 17 to p. 2 line 21 and p. 2 line 25 to 27.

* cited by examiner

Primary Examiner — Andrew Nalven
Assistant Examiner — Huan V Doan
(74) Attorney, Agent, or Firm — Fujitsu Patent Center

(57) ABSTRACT

In an access monitoring method executed by a computer: information on a first link is recorded when a request for access through the first link is detected and authentication information is transmitted through the first link; and when an email containing information on a second link is received and a request for access through the second link is detected, a determination whether or not the information on the second link is identical, in a predetermined part, to the recorded information on the first link is made. In the case where yes is determined, access through a link is forbidden when the information on the link is identical, in the predetermined part, to the recorded information on the first link, and the recorded information on the first link is transmitted to a server which collects information on links.

9 Claims, 18 Drawing Sheets

(56) References Cited

U.S. PATENT DOCUMENTS

2010/0192212 A1* 7/2010 Raleigh ............................ 726/7
2010/0318623 A1* 12/2010 Bloch et al. ................... 709/206

FOREIGN PATENT DOCUMENTS

| JP | 2004-64215 A | 2/2004 |
|---|---|---|
| JP | 2005-346592 | 12/2005 |
| JP | 2007-179522 | 7/2007 |
| WO | WO-2005/015422 A | 2/2005 |

FIG. 12

132 VIRUS DEFINITION FILE

| URL | Status |
|---|---|
| https://www.abcdef.co.jp/ | 0 |
| http://www.xxxx.com/ | 1 |
| . . . . . . | . . . . . . |

ACCESS MONITORING METHOD, INFORMATION PROCESSING APPARATUS, AND COMPUTER-READABLE MEDIUM STORING ACCESS MONITORING PROGRAM

CROSS-REFERENCE TO RELATED APPLICATION

This application is based upon and claims the benefits of priority of the prior Japanese Patent Application No. 2011-124397, filed on Jun. 2, 2011, the entire contents of which are incorporated herein by reference.

FIELD

The embodiments discussed herein relate to an access monitoring method, an information processing apparatus, and a computer-readable medium storing an access monitoring program.

BACKGROUND

In a known technique enabling discrimination of an illegal user in a system providing service to users through a network, authentication information such as a user ID and a password is received from each user, and authentication of the user is performed on the basis of the authentication information.

In a connection management method as another known technique used for a similar purpose, when authentication information for a user is received from a source of an access request, the user is informed of the occurrence of the access request by using an email or the like, and control for the access is started on receipt of a response from the user. (See, for example, Japanese Laid-open Patent Publication No. 2002-91917.)

In a known management server, when an access right of an end user is confirmed for an access request from the end user, a URL (uniform resource locator) for acquisition of a content is generated, the end user is informed of the URL, and the content is provided to the end user when the end user accesses the URL in a predetermined time. (See, for example, Japanese Laid-open Patent Publication No. 2002-288134.)

In a known mail server, personal authentication is performed when an email is transmitted to the mail server. When the authentication succeeds, a registered email address of the authenticated user is compared with an email address acquired from a header of the email, and the email is transmitted from the mail server to a destination when the email addresses are identical. (See, for example, Japanese Laid-open Patent Publication No. 2004-64215.)

Further, the crime called "fishing" is rapidly increasing. In the fishing, user's authentication information and the like are illegally collected by assuming a true service provider. For example, information is collected by informing a user of a URL of a website called "fishing website" (which is a counterfeit of a true website) by using an email or the like, and requesting the user accessing the fishing website to input authentication information.

The fishing websites are detected, for example, by manufacturers of vaccine software. The manufacturers of vaccine software update the vaccine software so as to prevent access to the detected fishing websites. However, the manners of detection of a fishing website which are adopted by the manufacturers of vaccine software cannot be used in users' terminals and the like.

SUMMARY

In view of the above, there is provided a computer-readable, non-transitory medium encoded with a computer program to be executed by a computer connected to a server which transmits an email containing first link information to an address associated with authentication information when the server receives the authentication information, and permits service provision through an apparatus being a source of the authentication information when the server receives access to a destination indicated by the first link information, where the computer is enabled to perform processing for making a display device display an input screen based on screen data which is received in response to access to a destination indicated by second link information, and transmit the authentication information to an apparatus being a source of the screen data when the authentication information is inputted into an input area arranged in the input screen. The computer program causes the computer to perform a procedure including: recording the second link information in a storage device when the computer detects a manipulation of the computer for requesting access to the destination indicated by the second link information; and determining whether or not the first link information is identical, in a predetermined part, to the second link information recorded in the storage device, when the computer receives the email containing the first link information and detects a manipulation of the computer for requesting access to the destination indicated by the first link information.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 12 illustrates an example of information recorded in a virus definition file in the second embodiment;

DESCRIPTION OF EMBODIMENTS

The embodiments will be explained below with reference to the accompanying drawings, wherein like reference numbers refer to like elements throughout.

1. First Embodiment

Figure 1:
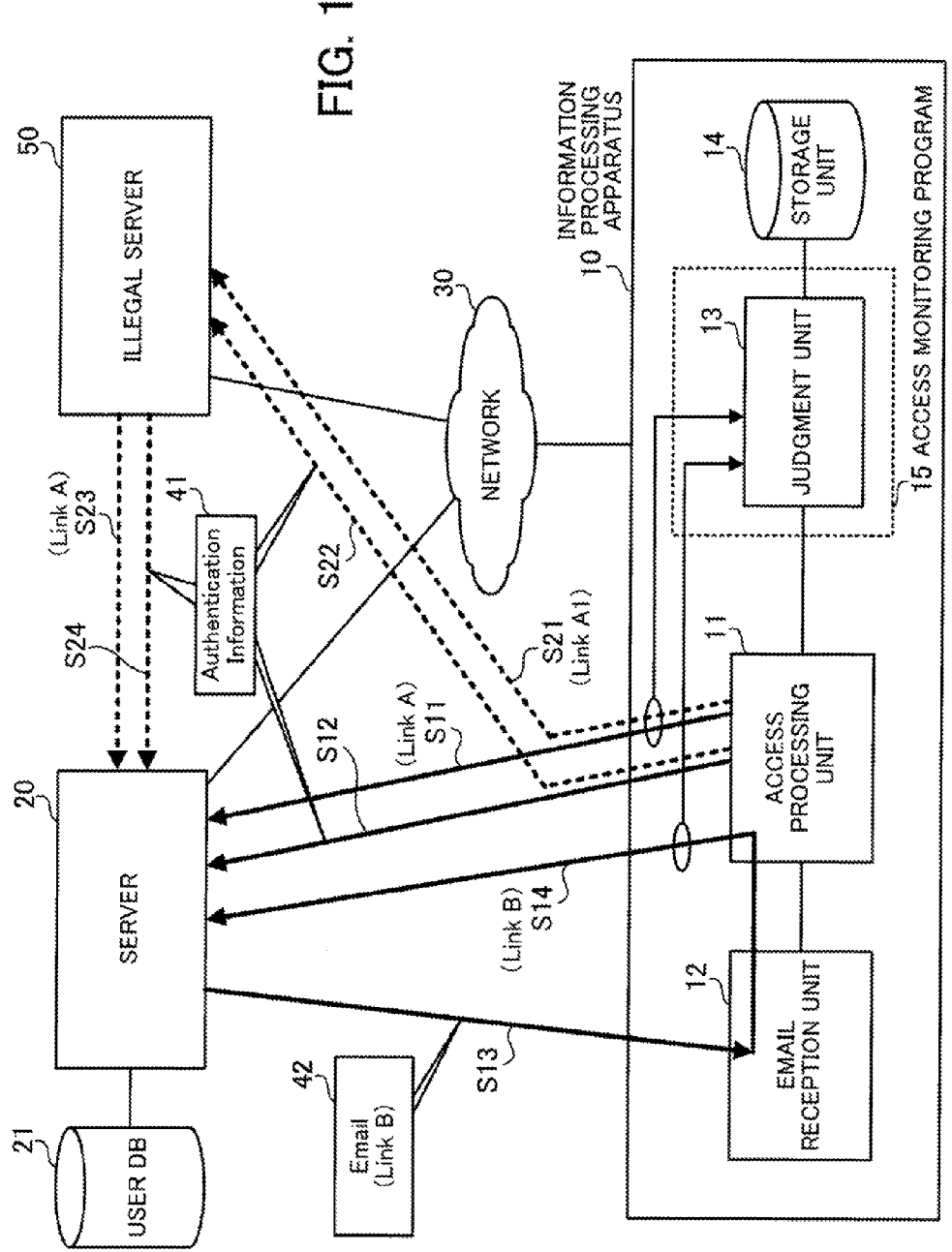
FIG. 1 illustrates an example of a construction of a computer network system according to a first embodiment.

FIG. 1 illustrates an example of a construction of a computer network system according to the first embodiment. In the computer network system illustrated in FIG. 1, an information processing apparatus 10 can access a server 20 through a network 30. The information processing apparatus 10 accesses a destination, for example, in response to a manipulation for requesting access to the destination, where the destination is indicated by link information. The link information is, for example, the URL. In the case where the destination which is requested to be accessed is the server 20, the information processing apparatus 10 accesses the server 20 on the basis of the link information.

The server 20 provides a predetermined service such as an electronic-commerce service through the network 30 to the user which uses the information processing apparatus 10. The server 20 can refer to a user DB (database) 21, in which authentication information for use in authentication of each user and an email address of each user are recorded.

The information processing apparatus 10 includes an access processing unit 11 and an email reception unit 12, which are processing functions for receiving a service from the server 20. Each of the operations performed by the access processing unit 11 and the email reception unit 12 can be realized when a CPU (central processing unit) arranged in the information processing apparatus 10 executes a predetermined program. A sequence of processing performed by the server 20 before a service is provided through the information processing apparatus 10 is explained below.

First, the server 20 performs processing for first authentication on the basis of authentication information 41, which is transmitted from the information processing apparatus 10. The authentication information 41 is information which enables the server 20 to determine whether or not the user is a legitimate user which is entitled to receive the service. For example, the authentication information 41 includes identification information for the user, a password of the user, and the like. The server 20 receives the authentication information 41, for example, through the following procedure.

In step S11, the access processing unit 11 in the information processing apparatus 10 accesses the destination indicated by the link information "Link A" in response to a manipulation of the information processing apparatus 10 performed by the user for requesting the access. For example, the access processing unit 11 accesses the destination indicated by the link information "Link A" in response to a manipulation for selection of the link information "Link A" which is indicated in an email received by the email reception unit 12. In this example, the destination indicated by the link information "Link A" is the server 20. When the server 20 receives the access, the server 20 transmits screen data for displaying an input screen for receiving input of the authentication information 41, to the information processing apparatus 10, which is the source of the access.

In step S12, the information processing apparatus 10 makes a display device display the input screen, and receives a manipulation for inputting the authentication information 41 into an input area which is arranged for inputting the authentication information 41 in the input screen. Then, the access processing unit 11 transmits the authentication information 41 inputted into the input screen, to the server 20 (which is the source of the screen data), in response to a manipulation of the information processing apparatus 10 performed by the user for requesting access.

In step S13, the server 20 performs the processing for the first authentication by comparing the received authentication information 41 with information recorded in the user DB 21. When the first authentication succeeds, the server 20 starts processing for second authentication. In the processing for the second authentication, the server 20 acquires from the user DB 21 an email address of the user associated with the received authentication information 41. Then, the server 20 transmits an email 42 containing link information "Link B", to the email address acquired from the user DB 21. Although the destination indicated by the link information "Link B" is the server 20, the server 20 may generate the link information "Link B" in such a manner that part of a character string constituting the link information "Link B" is a random character string.

In step S14, the email reception unit 12 in the information processing apparatus 10 receives the email 42 being transmitted from the server 20 and containing the link information "Link B", and accesses the server 20 (which is the destination indicated by the link information "Link B") in response to a manipulation for requesting access to the destination indicated by the link information "Link B". The manipulation for requesting access to the destination indicated by the link information "Link B" is, for example, a manipulation performed by the user of the information processing apparatus 10 for selection of the link information "Link B" indicated in the screen displaying the email 42.

When the server 20 receives the access from the information processing apparatus 10, the server 20 determines that the second authentication succeeds, and the server 20 permits service provision through the information processing apparatus 10. For example, the server 20 starts service provision, for example, by permitting browsing of a members webpage, and receiving various requests such as purchase orders of commodities.

According to the sequence of operations including the above steps S11 to S14, the server 20 doubly performs authentication processing, i.e., performs processing for the first and second authentication. Therefore, it is possible to prevent service provision to an improper user who is not entitled to receive the service provision.

Further, in the configuration of FIG. 1, an illegal server 50 is connected to the network 30. The illegal server 50 illegally acquires from the information processing apparatus 10 the authentication information 41 for a user in the following sequence.

In step S21, the illegal server 50 transmits to the email address of the user of the information processing apparatus 10 an email counterfeiting an email from a true service provider (which is hereinafter referred to as an illegal email). The illegal email contains link information "Link A1" for linkage to an input screen for inputting the authentication information 41. Then, the email reception unit 12 in the information processing apparatus 10 receives the illegal email, and the access processing unit 11 accesses the illegal server 50 in response to a manipulation for requesting access to the destination indicated by the link information "Link A1", where the illegal server 50 is the destination indicated by the link information "Link A1".

Alternatively, the illegal email may be transmitted from a device other than the illegal server 50. In addition, the information processing apparatus 10 may be informed of the link information "Link A1" by a means other than the email. For example, the information processing apparatus 10 may make the display device display a screen indicating the link information "Link A1" on the basis of display data supplied from a predetermined server, and the access processing unit 11 accesses the destination indicated by the link information "Link A1", in response to a manipulation for selection of the link information "Link A1" on the displayed screen.

In step S22, in response to access from the information processing apparatus 10, the illegal server transmits the screen data for displaying an input screen for receiving input of the authentication information 41, to the information processing apparatus 10, which is the source of the access. Then, the information processing apparatus 10 receives the screen data, and makes the display device display an input screen on the basis of the received screen data. The input screen based on the screen data transmitted from the illegal server 50 has a structure similar to the input screen based on the screen data transmitted from the server 20 in response to access to the destination indicated by the link information "Link A". Therefore, the information processing apparatus 10 receives a manipulation for inputting the authentication information 41 into an input area in the input screen. Subsequently, in response to the manipulation by the user for requesting access, the access processing unit 11 transmits the authentication information 41 inputted into the input screen, to the illegal server 50, from which the screen data for the input screen displayed above is transmitted. Thus, the illegal server 50 illegally acquires the authentication information 41.

Further, the illegal server 50 accesses the server 20 by using the acquired authentication information 41 in steps similar to the aforementioned steps S11 and S12. That is, the illegal server 50 accesses, in step S23, the destination indicated by the link information "Link A", and transmits, in step S24, the illegally acquired authentication information 41 to the server 20 through the input screen presented by the server 20.

When the server 20 receives the authentication information 41 from the illegal server 50, the server 20 transmits an email 42 to the user of the information processing apparatus 10 in a similar manner to step S13, where the link information "Link B" is indicated in the email 42. In the information processing apparatus 10, the email reception unit 12 receives the email 42, and accesses the server 20 in response to a manipulation for requesting access to the destination indicated by the link information "Link B". That is, even in the case where the sequence of operations is originated by access to the destination indicated by the link information "Link A1", the server 20 normally provides a service to the user through the information processing apparatus 10, and the user does not become aware of the theft of the authentication information 41.

However, the information processing apparatus 10 further includes a judgment unit 13 as a processing function of detecting the theft of the authentication information 41. The processing function of the judgment unit 13 is realized by execution of a program by the CPU arranged in the information processing apparatus 10. In the example of FIG. 1, the processing function of the judgment unit 13 is realized by execution of an access monitoring program 15.

When the judgment unit 13 detects a manipulation for inputting a request for access to a destination indicated by link information, the judgment unit 13 records the link information in a storage unit 14. For example, the judgment unit 13 detects a manipulation for requesting access to the destination indicated by the link information "Link A" or the destination indicated by the link information "Link A1", and records in the storage unit 14 the link information "Link A" or "Link A1" corresponding to the destination. The storage unit 14 may be externally arranged and connected to the information processing apparatus 10.

When the judgment unit 13 detects a manipulation for requesting access to a destination indicated by the link information which is contained in the email received by the email reception unit 12, the judgment unit 13 determines whether or not the link information contained in the email received by the email reception unit 12 is identical, in a predetermined part, to the link information recorded in the storage unit 14. When the judgment unit 13 determines that the link information contained in the email received by the email reception unit 12 is not identical, in a predetermined part, to the link information recorded in the storage unit 14, the judgment unit 13 determines the destination indicated by the link information recorded in the storage unit 14 to be an illegal destination. The predetermined part of the link information is, for example, the domain name in the URL.

For example, in the case where the access processing unit 11 accesses a destination indicated by the link information "Link A" or "Link A1", the email reception unit 12 receives the email 42 in which the link information "Link B" is indicated. In this case, when the judgment unit 13 detects a manipulation for requesting access to the destination indicated by the link information "Link B" (which is indicated in the email 42 as above), the judgment unit 13 compares, in the predetermined part, the link information "Link A" or "Link A1" (which is recorded in the storage unit 14) with the link information "Link B".

The link information "Link A" (which indicates the legal destination) is identical to the link information "Link B" in the predetermined part. On the other hand, the link information "Link A1" (which indicates the illegal destination) is not identical, in the predetermined part, to the link information "Link B". Therefore, the judgment unit 13 can determine that the link information "Link A1" indicates an illegal destination.

2. Second Embodiment

The second embodiment is explained below. The computer network system according to the second embodiment contains an electronic commerce server providing an electronic commerce service, so that users can place a purchase order of a commodity through a network. In the second embodiment, as explained below, each of customers' terminals can also detect whether or not authentication information is transmitted to an illegal destination.

2.1 System Configuration

Figure 2:
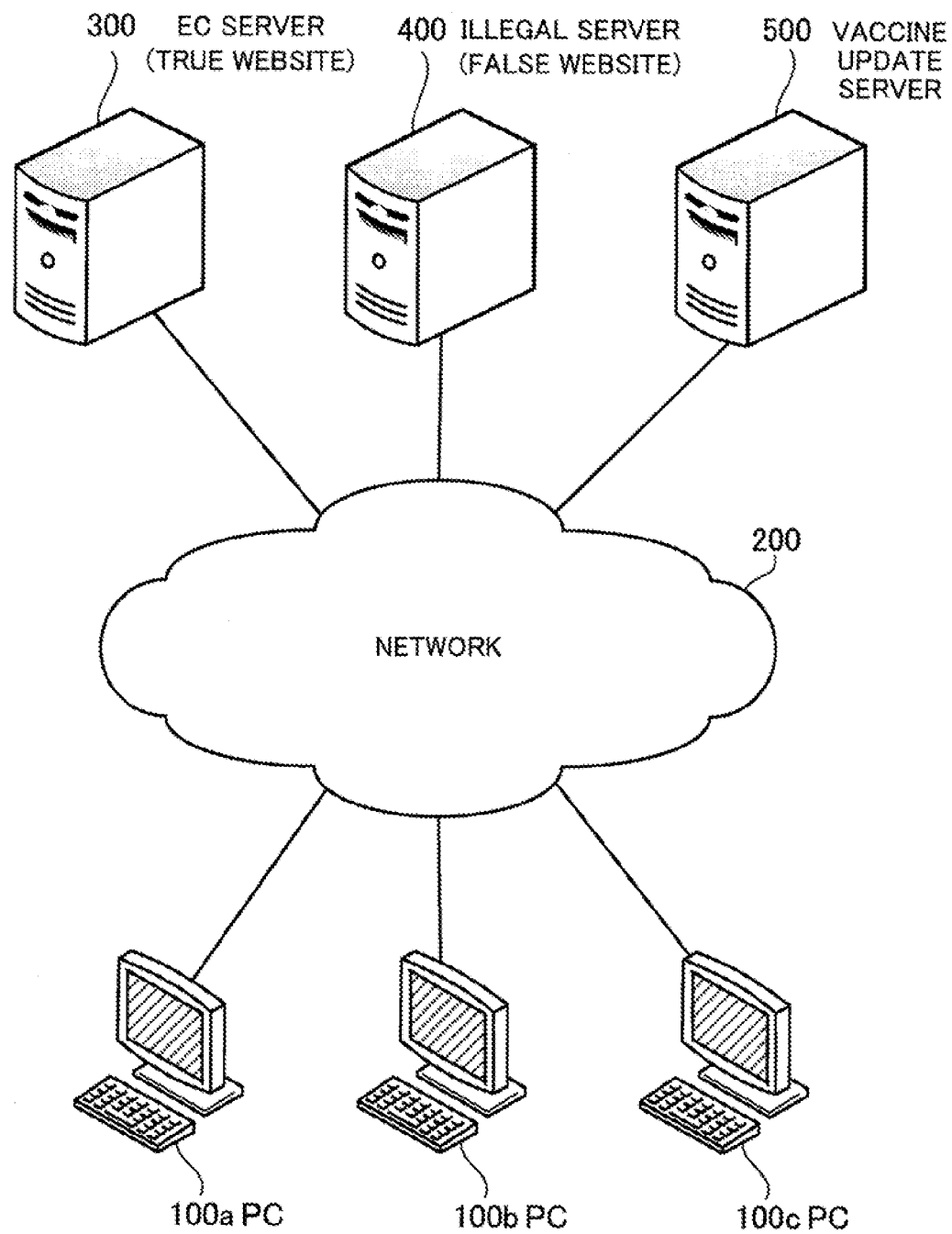
FIG. 2 illustrates an example of a configuration of a computer network system according to a second embodiment.

FIG. 2 illustrates an example of a configuration of a computer network system according to the second embodiment. In the computer network system of FIG. 2, personal computers (PCs) 100a to 100c are customers' terminals which are used by customers of an electronic commerce service, and are connected to a network 200.

In addition, an EC (electronic commerce) server 300 is connected to the network 200. The EC server 300 has functions of a web server, and provides an EC website to the customers' terminals 100a to 100c, where the EC website is a website for providing an electronic commerce service to the customers' terminals 100a to 100c. For example, the customer who uses the PC 100a can make a display device (belonging to the PC 100a) display the EC website provided by the EC server 300, and can select a commodity to purchase and place a purchase order of the commodity through the EC website. Similarly, each of the customers who use the PCs 100b and 100c can also receive the electronic commerce service provided by the EC server 300. In addition, the EC server 300 has a function of transmitting an email to each customer.

Further, an illegal server 400 is connected to the network 200 as illustrated in FIG. 2, and illegally collects customer information from the customers' terminals through the network 200, where the customer information includes authentication information for and personal information on the customers of the electronic commerce service provided by the EC server 300. The illegal server 400 provides a fishing website, which is a website for illegally collecting the customer information.

As explained later, the fishing website provided by the illegal server 400 is a false website which counterfeits the true website provided by the EC server 300. The illegal server 400 informs a customer of the URL of the false website, for example, by using an email. When access from a customer's terminal to the URL of the false website occurs, the illegal server 400 makes the customer's terminal display a webpage in the false website, and prompts the customer's terminal to transmit customer information to the illegal server 400 through the displayed webpage. Thus, the illegal server 400 acquires the customer information through the webpage in the false website.

Furthermore, a vaccine update server 500 is connected to the network 200. For example, the vaccine update server 500 is operated by a manufacturer of a vaccine program (or a computer-virus detection program). The vaccine update server 500 transmits the newest vaccine definition file to the PCs 100a to 100c, and makes the PCs 100a to 100c update a vaccine program which is installed in each of the PCs 100a to 100c.

Each of the PCs 100a to 100c executes a fishing-website detection program (which is also referred to as a monitoring program later) for detection of a fishing website, as well as the vaccine program. When each of the PCs 100a to 100c detects access to a fishing website by execution of the fishing-website detection program, the PC informs the vaccine update server 500 of the URL of the detected fishing website. The vaccine update server 500 collects one or more URLs of one or more fishing websites from the PCs 100a to 100c, and transmits to the PCs 100a to 100c a virus definition file in which the result of the collection is reflected.

2.2 Hardware Construction

Figure 3:
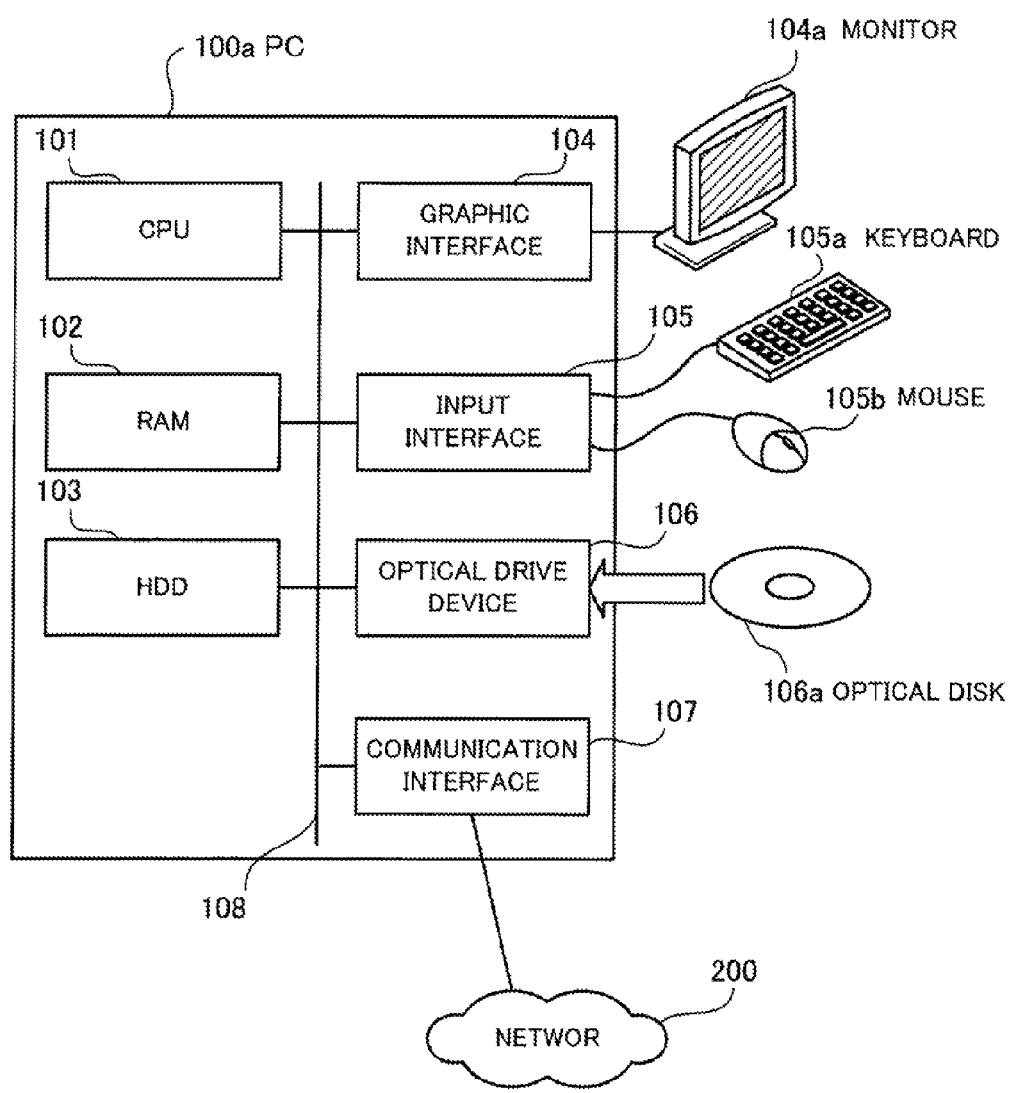
FIG. 3 illustrates an example of a hardware construction of a PC (personal computer) in the second embodiment.

FIG. 3 illustrates an example of a hardware construction of the PC 100a in the second embodiment. Although not shown, each of the PCs 100b and 100c has a similar hardware construction.

The entire PC 100a is controlled by a CPU (central processing unit) 101, to which a RAM (random access memory) 102 and more than one peripheral device are connected through a bus 108. The RAM 102 is used as a main memory of the PC 100a, and temporarily stores at least portions of programs to be executed by the CPU 101 and various types of data necessary for processing performed by the CPU 101, where the programs include an OS (operating system) program and application programs. The more than one peripheral device connected to the bus 108 includes an HDD (hard disk drive) 103, a graphic interface 104, an input interface 105, an optical drive device 106, and a communication interface 107.

The HDD 103 magnetically writes and reads data in and from a magnetic disk installed in the HDD 103. The HDD 103 is used as a secondary storage device in the PC 100a. The HDD 103 stores various data and programs executed by the CPU 101, where the programs include the OS (operating system) program and the application programs. Alternatively, a semiconductor storage device such as a flash memory can be used as the secondary storage device.

A monitor 104a is connected to the graphic interface 104. The graphic interface 104 makes the monitor 104a display an image on a screen in accordance with an instruction from the CPU 101. The monitor 104a is, for example, a liquid crystal display device. In addition, a keyboard 105a and a mouse 105b are connected to the input interface 105, which transmits signals outputted from the keyboard 105a and the mouse 105b, to the CPU 101 through the bus 108. The mouse 105b is an example of pointing device, and may be replaced with another pointing device such as a touchscreen, a graphic tablet, a touchpad, or a trackball.

The optical drive device 106 reads data recorded on an optical disk 106a by using laser light or the like. The optical disk 106a is a portable recording medium in which data are recorded in such a manner that the data can be read by using reflection of light. The optical disk 106a may be a DVD (Digital Versatile Disk), a DVD-RAM, a CD-ROM (Compact Disk-Read Only Memory), a CD-R (Recordable)/RW (Re-Writable), or the like.

The communication interface 107 is connected to the network 200, so that the PC 100a can exchange data through the communication interface 107 with other apparatuses such as the EC server 300.

Further, each of the EC server 300, the illegal server 400, and the vaccine update server 500 can also be realized by a hardware construction similar to FIG. 3.

2.3 Screen Transition on PC

Hereinbelow, an example of screen transition in each PC which is made when the customer receives an electronic commerce service through the true website provided by the EC server 300 is explained below. In the following explanations, a case in which the customer using the PC 100a receives the electronic commerce service is taken as an example.

Figure 4:
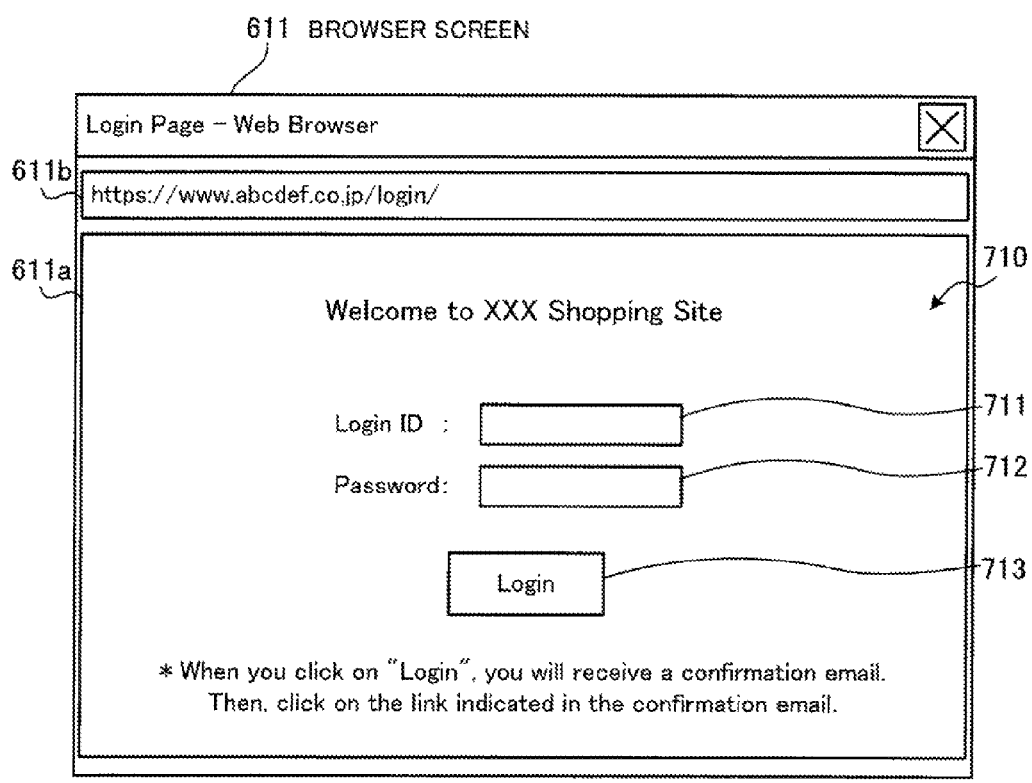
FIG. 4 illustrates an example of display of a login page in a true website in the second embodiment.

FIG. 4 illustrates an example of display of a login page in a true website in the second embodiment. The browser screen 611 illustrated in FIG. 4 is a (window) screen displayed on the monitor 104a connected to the PC 100a when the PC 100a executes a web browser program. The browser screen 611 contains a webpage display part 611a, in which a webpage is displayed. In addition, the browser screen 611 may include a URL indication part 611b, in which a URL of the webpage displayed in the webpage display part 611a is indicated.

In the example of FIG. 4, a login page 710 of the true website provided by the EC server 300 is displayed in the webpage display part 611a. The login page 710 is a webpage provided to a customer who is registered as a member in the electronic commerce service, for inputting login information in order to log in to the true website. In the login page 710, input areas 711 and 712, into which a login ID and a password are to be inputted as the login information, are displayed. When a customer performs a manipulation for inputting a login ID and a password respectively into the input areas 711 and 712, and clicks on a login button 713 arranged in the login page 710, the login ID and password are transmitted from the PC 100a to the EC server 300.

The login page 710 is displayed, for example, when the URL of the login page 710 is inputted into the URL indication part 611b and a link to the URL is requested by manipulations performed by the customer. Alternatively, the login page 710 may be displayed in response to a click on a hyperlink which is arranged in a predetermined webpage displayed in the webpage display part 611a. Further alternatively, the login page 710 may be displayed in response to a click on a hyperlink arranged in an email.

The EC server 300 is configured to be able to refer to a customer database in which customer information including login IDs and passwords is recorded. When the EC server 300 receives the login ID and the password from the PC 100a, the EC server 300 compares the received login ID and password with the customer information in the customer database, and determines whether or not the combination of the received login ID and password is valid. In the case where the combination of the received login ID and password is valid, the EC server 300 transmits a confirmation email addressed to the email address of the customer which is associated with the login ID in the customer database, where the confirmation email is an email transmitted for confirming that the login is requested.

Figure 5:
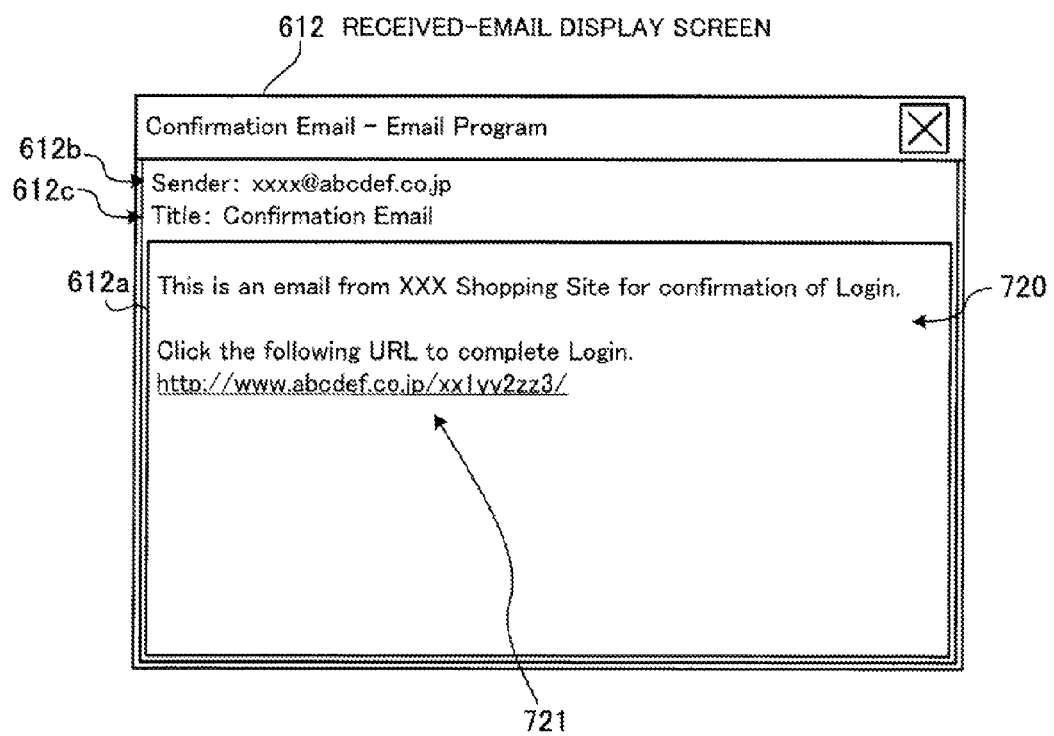
FIG. 5 illustrates an example of display of a confirmation email in the second embodiment.

FIG. 5 illustrates an example of display of the confirmation email in the second embodiment. The received-email display screen 612 illustrated in FIG. 5 is a screen for displaying an email received from a mail server. The received-email display screen 612 is one of screens (windows) displayed on the monitor 104a connected to the PC 100a when the PC 100a executes an email program. The received-email display screen 612 contains a mail-body display part 612a, in which the body of a received email is displayed. In the example of FIG. 5, a confirmation email 720 transmitted from the EC server 300 is displayed in the mail-body display part 612a. In addition, the received-email display screen 612 may contain, for example, an address indication area 612b and a title indication area 612c, where an email address of the sender of the received email is indicated in the address indication area 612b, and title of the received email is indicated in the title indication area 612c.

When the EC server 300 transmits a confirmation email, the EC server 300 generates a confirmation URL for receiving a manipulation performed by a customer for login confirmation, and writes the generated confirmation URL in the body of the confirmation email. At this time, the EC server 300 generates the confirmation URL by adding a random character string ("xx1yy2zz3" in the example of FIG. 5) to the end of the domain name of the EC site. The domain name is "the character string "abcdef.co.jp" in the example illustrated in FIGS. 4 and 5.

In the confirmation email 720 illustrated in FIG. 5, a confirmation URL generated by the EC server 300 is indicated in the form of a hyperlink 721. After a customer performs a manipulation for logging in to the electronic commerce service through the login page 710 illustrated in FIG. 4, the customer clicks on the hyperlink 721 to the confirmation URL in order to inform the EC server 300 that the customer surely logs in to the electronic commerce service. The destination of the hyperlink 721 is a webpage provided by the EC server 300, and the PC 100a accesses the EC server 300 in response to the click on the hyperlink 721. When the EC server 300 detects the access to the confirmation URL, the EC server 300 determines that authentication of the customer succeeds. Then, the EC server 300 makes the PC 100a (as the source of the access to the confirmation URL) display a members webpage (i.e., webpage for only the members in the electronic commerce service).

Figure 6:
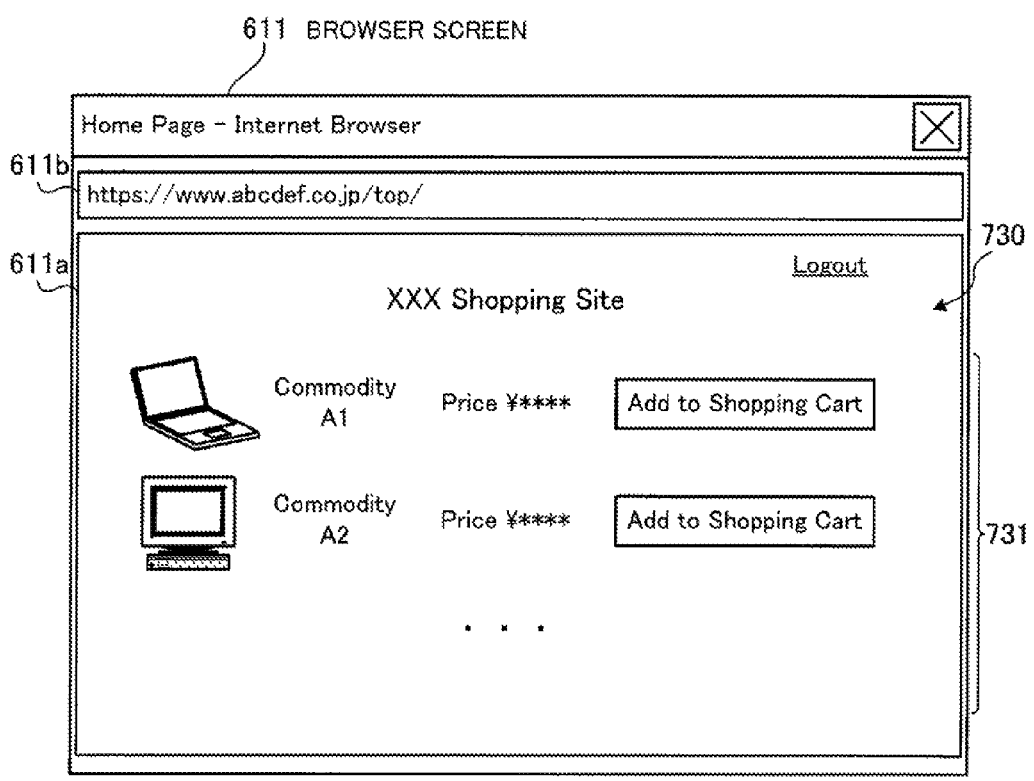
FIG. 6 illustrates an example of display of a members webpage in the second embodiment.

FIG. 6 illustrates an example of display of a members webpage in the second embodiment. In the webpage display part 611a in the browser screen 611 illustrated in FIG. 6, an example of a members webpage 730 is displayed. For example, a commodity-list display area 731 is arranged in the members webpage 730, where the commodity-list display area 731 is a list of commodities which the customer can purchase. Thus, the customer can place a purchase order of one or more of the commodities by performing a manipulation on the indications of the one or more of the commodities in the above list displayed in the commodity-list display area 731.

As indicated in FIGS. 4 to 6, in order to authenticate a customer requesting login, the EC server 300 performs the first authentication based on the combination of the login ID and the password, and the second authentication based on the access to the confirmation URL which is randomly generated. When both of the first authentication and the second authentication succeed, the EC server 300 permits the customer to browse members webpages. Thus, the EC server 300 can prevent illegal access such as customer impersonation by performing the above double authentication.

Next, screen transition in the PC 100a is explained below for the case where a customer receives an electronic commerce service through a false website, which is a fishing website. In the following explanations, it is assumed that initially the illegal server 400 transmits to the PC 100a a URL-notification email notifying the PC 100a of a URL of a login webpage in the false website.

Figure 7:
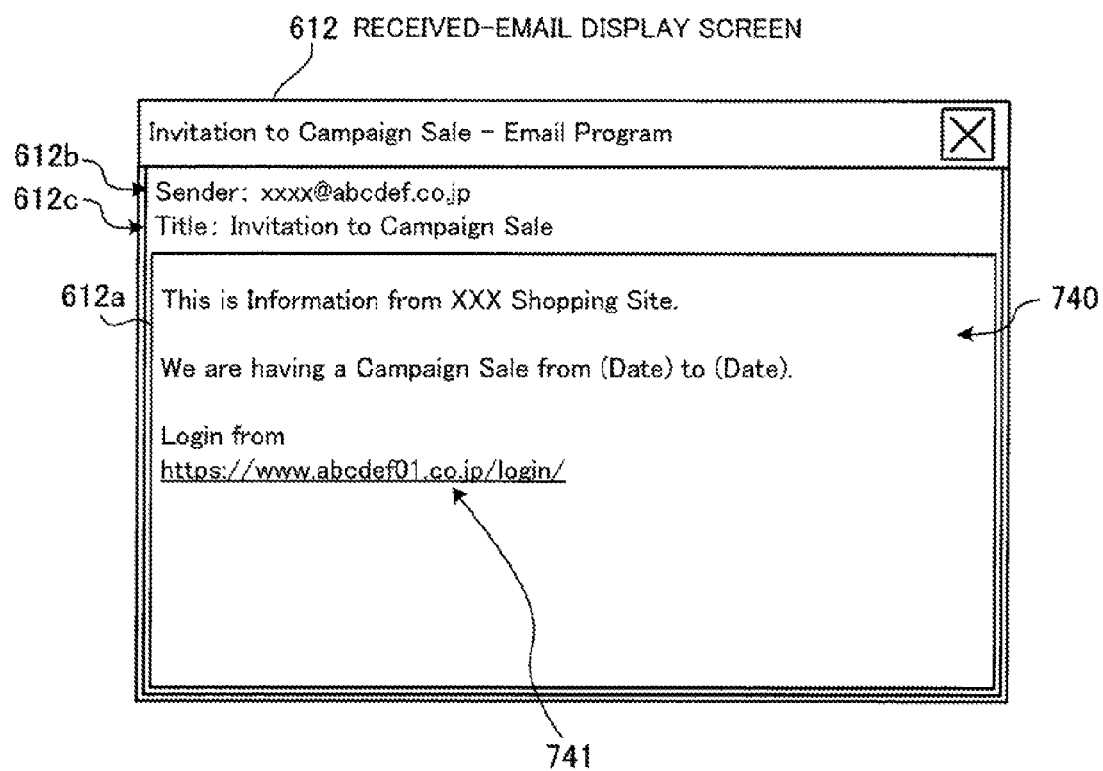
FIG. 7 illustrates an example of display of a URL-notification email received from an illegal server in the second embodiment.

FIG. 7 illustrates an example of display of a URL-notification email received from an illegal server in the second embodiment. In the received-email display screen 612 illustrated in FIG. 7, the body of a URL-notification email 740 transmitted from the illegal server 400 is displayed in the mail-body display part 612a. In the mail-body display part 612a, the URL contained in the URL-notification email 740 is displayed in the form of a hyperlink 741.

Incidentally, in the URL-notification email transmitted from the illegal server 400, the email address of the source of the URL-notification email is disguised in some cases. In the example of FIG. 7, the domain name in the source address indicated in the address indication area 612b is disguised as "abcdef.co.jp", which is the domain name of the true website.

However, the destination of the hyperlink 741 is a login webpage in the false website provided by the illegal server 400. When the customer using the PC 100a clicks on the hyperlink 741, the PC 100a accesses the illegal server 400. When the illegal server 400 detects the access to the login webpage in the false website, the illegal server 400 makes the PC 100a (as the source of the access) display the login webpage in the false website.

Figure 8:
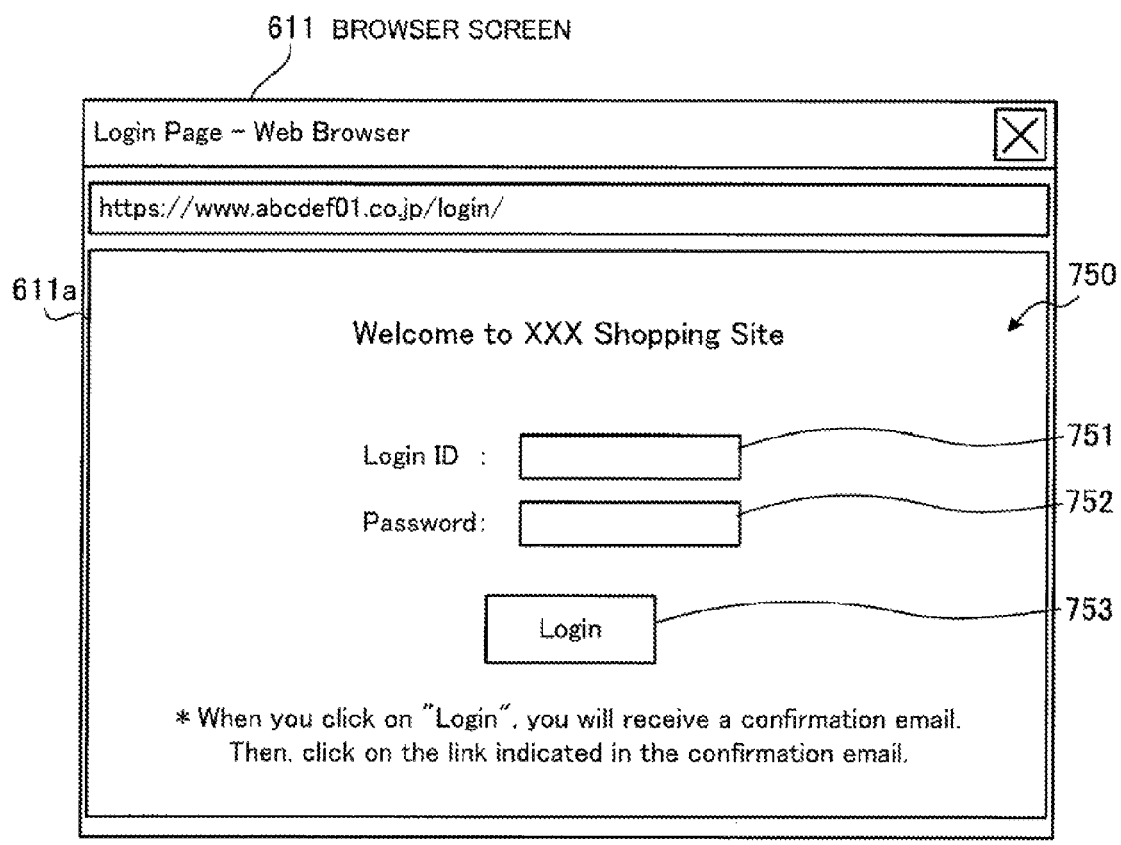
FIG. 8 illustrates an example of display of a login page in a false website in the second embodiment.

FIG. 8 illustrates an example of display of a login page in a false website in the second embodiment. In the browser screen 611 illustrated in FIG. 8, a login webpage 750 in a false website is displayed in the webpage display part 611a. In the login webpage 750, input areas 751 and 752 and a login button 753 are arranged. The input areas 751 and 752 are respectively provided for inputting the login ID and the password. That is, the login webpage 750 in the false website has a similar structure to the login page 710 in the true website, so that it is difficult to discriminate the login webpage 750 in the false website and the login page 710 in the true website. Therefore, the customer performs a manipulation for inputting the login ID and the password respectively into the input areas 751 and 752, and clicks on the login button 753. Thus, although the customer intends to transmit the login ID and the password to the EC server 300, the login ID and the password are actually transmitted from the PC 100a to the illegal server 400.

When the illegal server 400 receives the login ID and the password which are transmitted from the PC 100*a* as above, the illegal server 400 stores the login ID and the password in a storage device or the like, transmits the login ID and the password to the EC server 300, and requests login to the true website provided by the EC server 300. Then, the EC server 300 performs the aforementioned first authentication on the basis of the login ID and the password which are received from the illegal server 400. In the first authentication, the combination of the login ID and the password is determined to be valid. Therefore, the EC server 300 transmits the aforementioned confirmation email to the email address of the customer corresponding to the received login ID.

When the PC 100*a* receives the confirmation email from the EC server 300, the customer clicks on a hyperlink to a confirmation URL which is arranged in the confirmation email (and similar to the aforementioned hyperlink 721 illustrated in FIG. 5). The PC 100*a* accesses the EC server 300 in response to the click on the hyperlink. When the EC server 300 receives the access from the PC 100*a*, the EC server 300 determines that the aforementioned second authentication succeeds, and makes the PC 100*a* display a members webpage.

As explained above, even when the customer using the PC 100*a* inputs the login ID and the password into the login webpage in a false website, the customer can log in to the true website in a similar sequence to the sequence in the case where the customer inputs the login ID and the password into the login webpage in the true website. The illegal server 400 can illegally acquire the login ID and the password while the customer is unaware of the illegal acquisition.

Incidentally, the manufacturer of the vaccine program searches the network for a fishing website, and updates the virus definition file in the vaccine program so as to stop access to the fishing website which is found by the search. In addition, in some cases, the manufacturer of the vaccine program updates the virus definition file on the basis of information sent from each user who finds a fishing website.

However, there is a time lag between the occurrence of the fishing website and delivery to the users' terminals of the virus definition file which is updated to stop the access to the fishing website. Therefore, damages from the thefts of the customer information by the fishing website can increase before the delivery of the updated virus definition file.

On the other hand, the PCs 100*a* to 100*c* execute the fishing-website detection program (the monitoring program) for detection of a fishing website as well as the vaccine program. When the fishing-website detection program is executed, for example, the PC 100*a* performs the following operations.

When the fishing-website detection program is executed, the PC 100*a* can detect access to a fishing website by itself. The PC 100*a* notifies the vaccine update server 500 of the URL of the detected fishing website, and temporarily registers at least the domain name of the URL of the detected fishing website in the virus definition file in the vaccine program which is executed by the PC 100*a*.

When the vaccine update server 500 is notified of the URL of the fishing website, the inspector in the manufacturer of the vaccine program performs an inspection of the operations performed after a link to the URL of the fishing website is established, on the basis of the URL. When the destination of the URL is determined to be surely a fishing website, the vaccine update server 500 requests the PC 100*a* (which detects the fishing website) to permanently register the information temporarily registered in the virus definition file.

Further, the vaccine update server 500 generates a virus definition file in which at least the domain names of the URLs the destinations of which are determined to be fishing websites, and delivers the virus definition file to the PCs 100*a* to 100*c*.

As explained above, when the PC 100*a* executing the fishing-website detection program detects a fishing website, the PC 100*a* temporarily registers in the virus definition file at least the domain name in the URL of the fishing website. Therefore, the PC 100*a* can immediately configure itself to stop access to the fishing website. In addition, the PC 100*a* can also stop access to other fishing websites having the same domain name and providing login webpages and the like for different services. Thus, it is possible to prevent increase in the damages from the thefts of customer information.

2.4 Functions of Apparatuses

Hereinbelow, the functions performed by each of the PCs 100*a* to 100*c*, the EC server 300, the illegal server 400, and the vaccine update server 500 are explained in detail.

Figure 9:
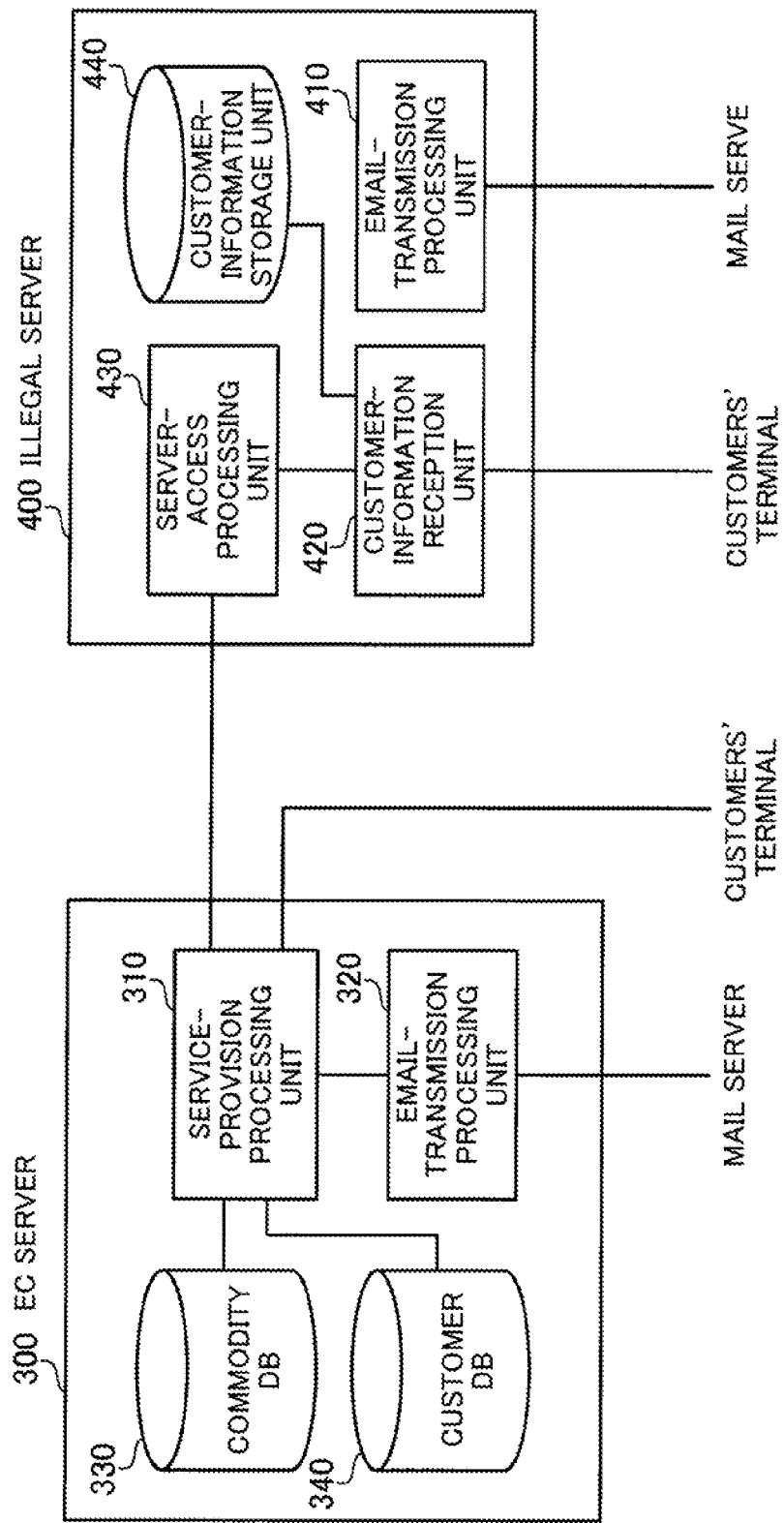
FIG. 9 illustrates examples of processing functions of an EC (electronic commerce) server and an illegal server in the second embodiment.

FIG. 9 illustrates examples of processing functions of the EC server 300 and the illegal server 400 in the second embodiment.

As illustrated in FIG. 9, the EC server 300 includes a service-provision processing unit 310 and an email-transmission processing unit 320. The functions of each of the service-provision processing unit 310 and the mail-transmission processing unit 320 can be realized, for example, when the CPU in the EC server 300 executes a predetermined program.

The storage device connected to the EC server 300 stores a commodity DB (database) 330 and a customer DB 340. Information on commodities for sale to customers is recorded in the commodity DB 330, and the information recorded in the commodity DB 330 includes the commodity IDs (for identifying the respective commodities), the names and prices of the commodities, URLs of webpages indicating details of the commodities, and the like. On the other hand, information on customers which are registered as members is recorded in the customer DB 340.

Figure 10:
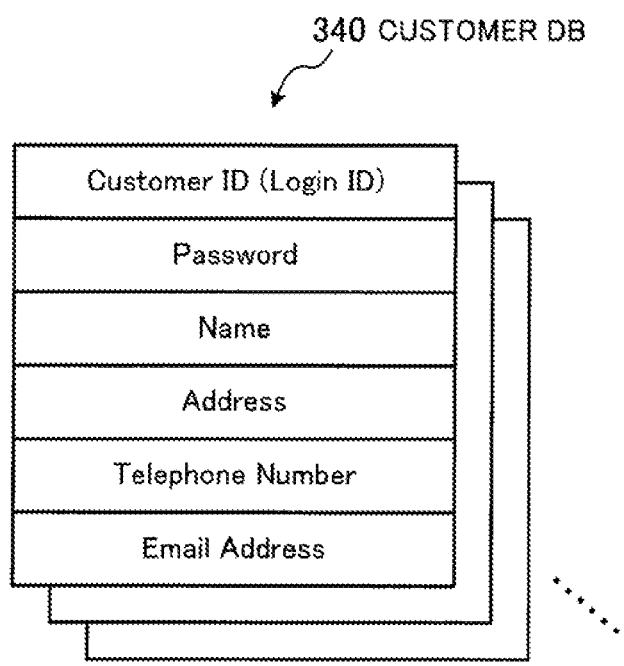
FIG. 10 illustrates an example of information recorded in a customer DB (database) in the second embodiment.

FIG. 10 illustrates an example of information recorded in the customer DB in the second embodiment. The customer DB 340 stores a record for each customer. Each record in the customer DB 340 includes, for example, a customer ID (for identifying the customer), a password (for the customer logging in to the EC server 300), the name, address, telephone number, and email address of the customer. In the example of FIG. 10, the customer ID is assumed to be also used as the login ID.

Referring back to FIG. 9, the service-provision processing unit 310 performs functions of a web server which provides the EC website to the customers. In addition, the mail-transmission processing unit 320 transmits an email in response to a request from the service-provision processing unit 310.

The service-provision processing unit 310 performs authentication processing in response to a login request from a customer's terminal, and starts provision of members webpages when the authentication succeeds. For example, the service-provision processing unit 310 makes the customers' terminal display a webpage (e.g., the members webpage 730 illustrated in FIG. 6) which prompts the customer to select information on a commodity, and receives input of information necessary for purchasing the commodity (e.g., information on a credit card and the destination of the commodity). Thereafter, the service-provision processing unit 310 completes the processing for the purchase.

In the authentication processing performed in response to the login request, the aforementioned first authentication and second authentication are performed. Specifically, the service-provision processing unit 310 makes the customers' terminal display a login webpage as illustrated in FIG. 4, and receives a login ID and a password from the customers' terminal. Then, the service-provision processing unit 310 refers to the customer DB 340, and determines whether or not the combination of the received login ID and password is valid. When the combination is determined to be valid, the service-provision processing unit 310 determines that the first authentication succeeds.

When the first authentication succeeds, the service-provision processing unit 310 extracts an email address associated with the received login ID, and generates a confirmation URL by adding a random character string to the end of the domain name of the EC website. Then, the service-provision processing unit 310 makes the mail-transmission processing unit 320 transmit a confirmation email to the email address extracted from the customer DB 340, where the confirmation URL is indicated in the body of the confirmation email. Thereafter, when the service-provision processing unit 310 detects access to the confirmation URL, the service-provision processing unit 310 determines that the second authentication succeeds.

As illustrated in FIG. 9, the illegal server 400 includes an email-transmission processing unit 410, a customer-information reception unit 420, and a server-access processing unit 430. The functions of each of the email-transmission processing unit 410, the customer-information reception unit 420, and the server-access processing unit 430 can be realized, for example, when the CPU in the illegal server 400 executes a predetermined program.

The email-transmission processing unit 410 transmits a URL-notification email as illustrated in FIG. 7 to a mail server (not shown in FIG. 9), where the URL-notification email is an email for notification of a URL of a login webpage in a false website. The email-transmission processing unit 410 may be arranged in a device different from the illegal server 400.

The customer-information reception unit 420 performs functions realizing a web server which provides a login webpage in a false website (as illustrated in FIG. 8) to the customers. When the customer-information reception unit 420 detects access to the destination indicated by the URL written in the URL-notification email, the customer-information reception unit 420 makes the source of the access display the login webpage in the false website. In addition, the customer-information reception unit 420 receives from the source of the access a login ID and a password which are inputted into the input areas in the displayed login webpage, and records the received login ID and password in a customer-information storage unit 440.

The server-access processing unit 430 accesses the EC server 300, and receives data of the login webpage from the service-provision processing unit 310. The server-access processing unit 430 transmits the login ID and password received by the customer-information reception unit 420, to the service-provision processing unit 310 in the EC server 300 through the login webpage, and requests login.

Figure 11:
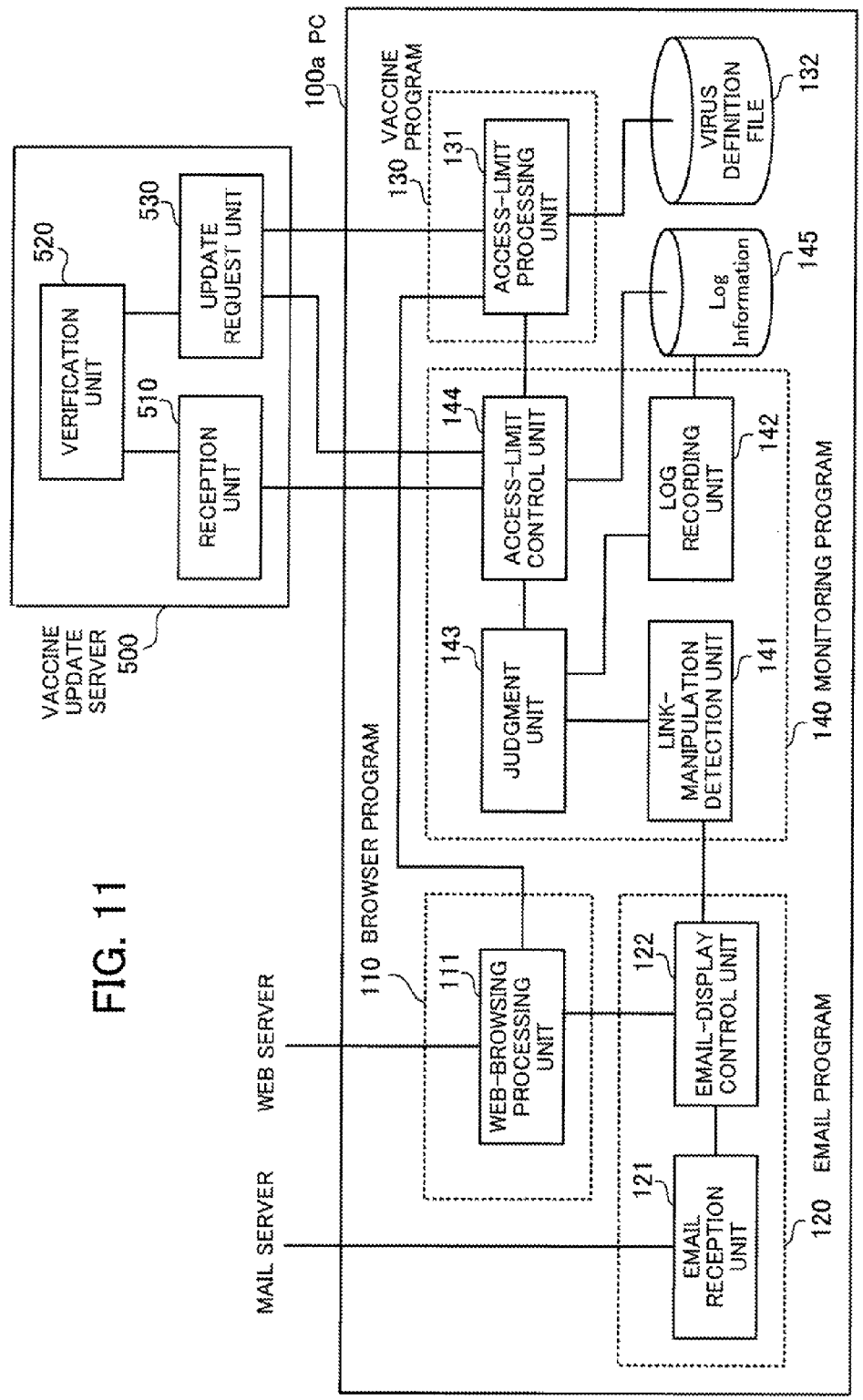
FIG. 11 illustrates examples of processing functions of a PC as a customers' terminal and a vaccine update server in the second embodiment.

FIG. 11 illustrates examples of processing functions of the PC 100a as a customers' terminal and the vaccine update server 500 in the second embodiment. Although the processing functions of the PCs 100b and 100c are not shown in FIG. 11, each of the PCs 100b and 100c also has similar processing functions to the PC 100a.

As illustrated in FIG. 11, the PC 100a includes a web-browsing processing unit 111, an email reception unit 121, an email-display control unit 122, an access-limit processing unit 131, a link-manipulation detection unit 141, a log recording unit 142, a judgment unit 143, and an access-limit control unit 144.

The functions of the web-browsing processing unit 111 can be realized, for example, when the CPU 101 in the PC 100a executes a browser program 110. The web-browsing processing unit 111 performs processing for making the monitor 104a display webpages provided from a web server by communication with the web server, processing for transmitting to the web server information inputted into input areas in the displayed webpages, and other processing. The web server with which the web-browsing processing unit 111 performs communication may correspond to, for example, the service-provision processing unit 310 in the EC server 300 or the customer-information reception unit 420 in the illegal server 400.

The functions of the email reception unit 121 and the email-display control unit 122 can be realized, for example, when the CPU 101 in the PC 100a executes an email program 120. The email reception unit 121 receives emails from the mail server. The emails received from the mail server by the email reception unit 121 include, for example, the confirmation email transmitted from the email-transmission processing unit 320 in the EC server 300, the URL-notification email transmitted from the email-transmission processing unit 410 in the illegal server 400, and other emails.

The email-display control unit 122 makes the monitor 104a display emails received by the email reception unit 121. In addition, the email-display control unit 122 displays the URL indicated in each email, in the form of a hyperlink. When the email-display control unit 122 detects a manipulation of clicking on a hyperlink arranged in the body of a displayed email, the email-display control unit 122 requests the web-browsing processing unit 111 to access the destination indicated by the clicked hyperlink.

The functions of the access-limit processing unit 131 can be realized, for example, when the CPU 101 in the PC 100a executes a vaccine program 130. The access-limit processing unit 131 monitors operations of a processing unit in the PC 100a which accesses an external apparatus, and forbids access to destinations registered in the virus definition file 132. The processing unit in the PC 100a which accesses an external apparatus includes the web-browsing processing unit 111. In addition, the access-limit processing unit 131 updates the virus definition file 132 in response to a request from the vaccine update server 500 or the access-limit control unit 144.

FIG. 12 illustrates an example of information recorded in the virus definition file 132 in the second embodiment. The virus definition file 132 is stored, for example, in the HDD 103 in the PC 100a. As illustrated in FIG. 12, a list of URLs respectively indicating destinations to which the access is forbidden is recorded in the virus definition file 132. In addition, the status information indicating whether each URL is registered in the virus definition file 132 temporarily or permanently is also recorded in the virus definition file 132. The value of the status information is "0" when the URL is temporarily registered, and "1" when the URL is permanently registered.

Referring back to FIG. 11, the functions of the link-manipulation detection unit 141, the log recording unit 142, the judgment unit 143, and the access-limit control unit 144 can be realized, for example, when the CPU 101 in the PC 100a executes a monitoring program 140 (corresponding to the aforementioned fishing-website detection program). The monitoring program 140 may be contained in the vaccine program 130.

In the case where a hyperlinked URL is indicated in the body of an email displayed on the monitor 104a by the email-display control unit 122, the link-manipulation detection unit 141 performs an operation for detecting a click on the hyperlinked URL. When the link-manipulation detection unit 141 detects a click on the hyperlinked URL, the link-manipulation detection unit 141 notifies the judgment unit 143 of the URL.

The log recording unit 142 records as part of log information 145 a log of operations performed by the PC 100a for a period according to a request from the judgment unit 143, for example, in the RAM 102 in the PC 100a.

Figure 13:
FIG. 13 illustrates an example of information recorded as log information in the second embodiment.

FIG. 13 illustrates an example of information recorded as part of the log information 145 in the second embodiment. The log information 145 illustrated in FIG. 13 includes a history of operations performed by execution of the browser program 110 and a history of operations performed by execution of the email program 120, which are recorded with timestamps.

For example, the log recording unit 142 records as part of the log information 145 a history of access to the web server by the web-browsing processing unit 111. At this time, the URLs of the destinations of the access are recorded. In addition, the log recording unit 142 records as part of the log information 145 a history of operations for displaying webpages performed by the web-browsing processing unit 111. Further, the log recording unit 142 records as part of the log information 145 a history of operations of receiving input of data into input areas in displayed webpages and a history of operations of detecting clicks on image links. At this time, the inputted data, information indicating the positions of the input area through which the data are inputted, information indicating the positions of the clicked image links, and other information are recorded as part of the log information 145. Furthermore, the log recording unit 142 records as part of the log information 145 a history of operations of receiving emails performed by the email reception unit 121. At this time, the addresses of the sources and destinations of the received emails and other information are recorded as part of the log information 145. Moreover, the log recording unit 142 records as part of the log information 145 a history of operations of detecting clicks on hyperlinked URLs in emails displayed by the email-display control unit 122. At this time, the clicked URLs and other information are recorded as part of the log information 145.

Referring back to FIG. 11, the judgment unit 143 determines whether or not a fishing website is accessed, on the basis of the URL of which the judgment unit 143 is notified by the link-manipulation detection unit 141. When the judgment unit 143 is notified of the URL by the link-manipulation detection unit 141, the judgment unit 143 stores the URL, for example, in the RAM 102 in the PC 100a, and makes the log recording unit 142 start recording of the log.

Thereafter, when the judgment unit 143 is again notified of the above URL by the link-manipulation detection unit 141, the judgment unit 143 makes the log recording unit 142 terminate the recording of the log, and compares the domain name in the URL of which the judgment unit 143 is notified, with the domain name in the URL stored in the RAM 102. When the above domain names are not identical, the judgment unit 143 determines that the destination indicated by the URL stored in the RAM 102 is a fishing website, i.e., the judgment unit 143 detects a fishing website.

The access-limit control unit 144 requests the access-limit processing unit 131 to temporarily register in the virus definition file 132 the URL of the fishing website detected by the judgment unit 143. In addition, the access-limit control unit 144 transmits to the vaccine update server 500 the log information 145 and the URL of the detected fishing website, and requests the vaccine update server 500 to verify the fishing website indicated by the URL.

After the request to the vaccine update server 500 for the verification, the access-limit control unit 144 receives from the vaccine update server 500 an instruction indicating whether to permanently register the URL which is temporarily registered in the virus definition file 132. When the access-limit control unit 144 is instructed to permanently register the URL, the access-limit control unit 144 requests the access-limit processing unit 131 to permanently register the temporarily registered URL. On the other hand, when the access-limit control unit 144 is instructed not to permanently register the URL, the access-limit control unit 144 requests the access-limit processing unit 131 to delete the temporarily registered URL from the virus definition file 132.

Further, as illustrated in FIG. 11, the vaccine update server 500 includes a reception unit 510, a verification unit 520, and an update request unit 530. The functions of the reception unit 510, the verification unit 520, and the update request unit 530 can be realized, for example, when a CPU in the vaccine update server 500 executes a predetermined program. The reception unit 510 receives the URL of the fishing website and the log information from the access-limit control unit 144 in the customers' terminal (e.g., the PC 100a). The verification unit 520 performs processing for supporting the operation for verifying whether or not the destination of the URL received by the reception unit 510 is a fishing website. For example, the verification unit 520 makes the display device display the received log information. For example, the operator who works for the verification refers to the displayed log information, performs a manipulation of the vaccine update server 500 for accessing the website indicated by the received URL, and verifies whether or not operations similar to the operations performed in the customers' terminal are performed in the vaccine update server 500. When a result of the verification is inputted into the vaccine update server 500, the verification unit 520 informs the update request unit 530 of the result of the verification. In the case where the verification supported by the verification unit 520 determines that the destination indicated by the URL of which the vaccine update server 500 is informed by the access-limit control unit 144 is a fishing website, the update request unit 530 instructs the access-limit control unit 144 in the customers' terminal (which informs the vaccine update server 500 of the URL) to permanently register the URL temporarily registered in the virus definition file 132. In addition, the update request unit 530 informs the other customers' terminals (the customers' terminals other than the above customers' terminal which informs the vaccine update server 500 of the URL) of the URL the destination of which is determined to be a fishing website, and requests the other customers' terminals to register the URL in the virus definition file 132. On the other hand, in the case where the verification supported by the verification unit 520 determines that the destination indicated by the URL of which the vaccine update server 500 is informed by the access-limit control unit 144 is not a fishing website, the update request unit 530 instructs the access-limit control unit 144 in the customers' terminal (which informs the vaccine update server 500 of the URL) to delete the temporarily registered URL from the virus definition file 132.

2.5 Sequence of Operations

Figure 14:
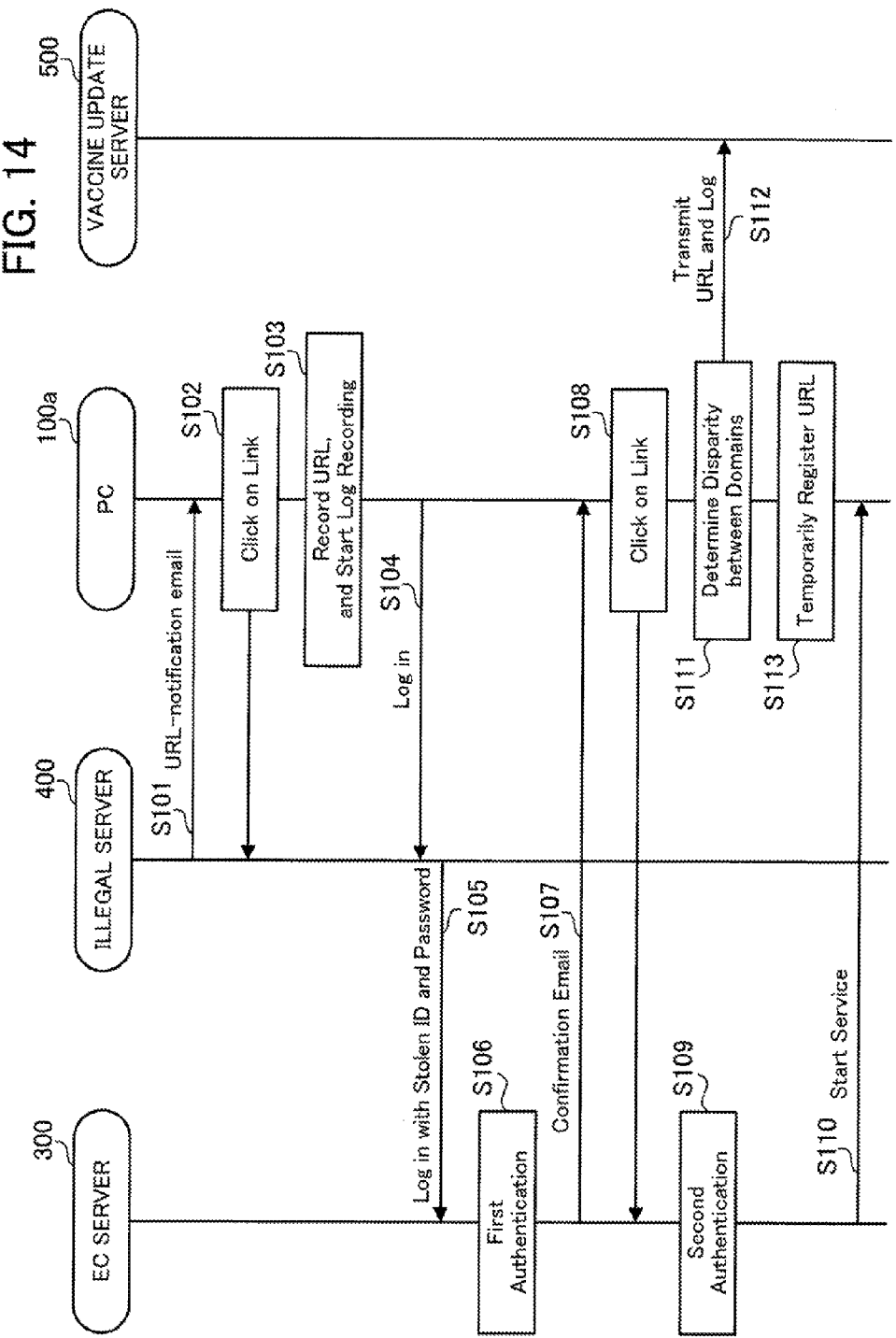
FIG. 14 indicates a first part of a sequence of processing performed when a PC accesses an EC website through a fishing website in the second embodiment.
Figure 15:
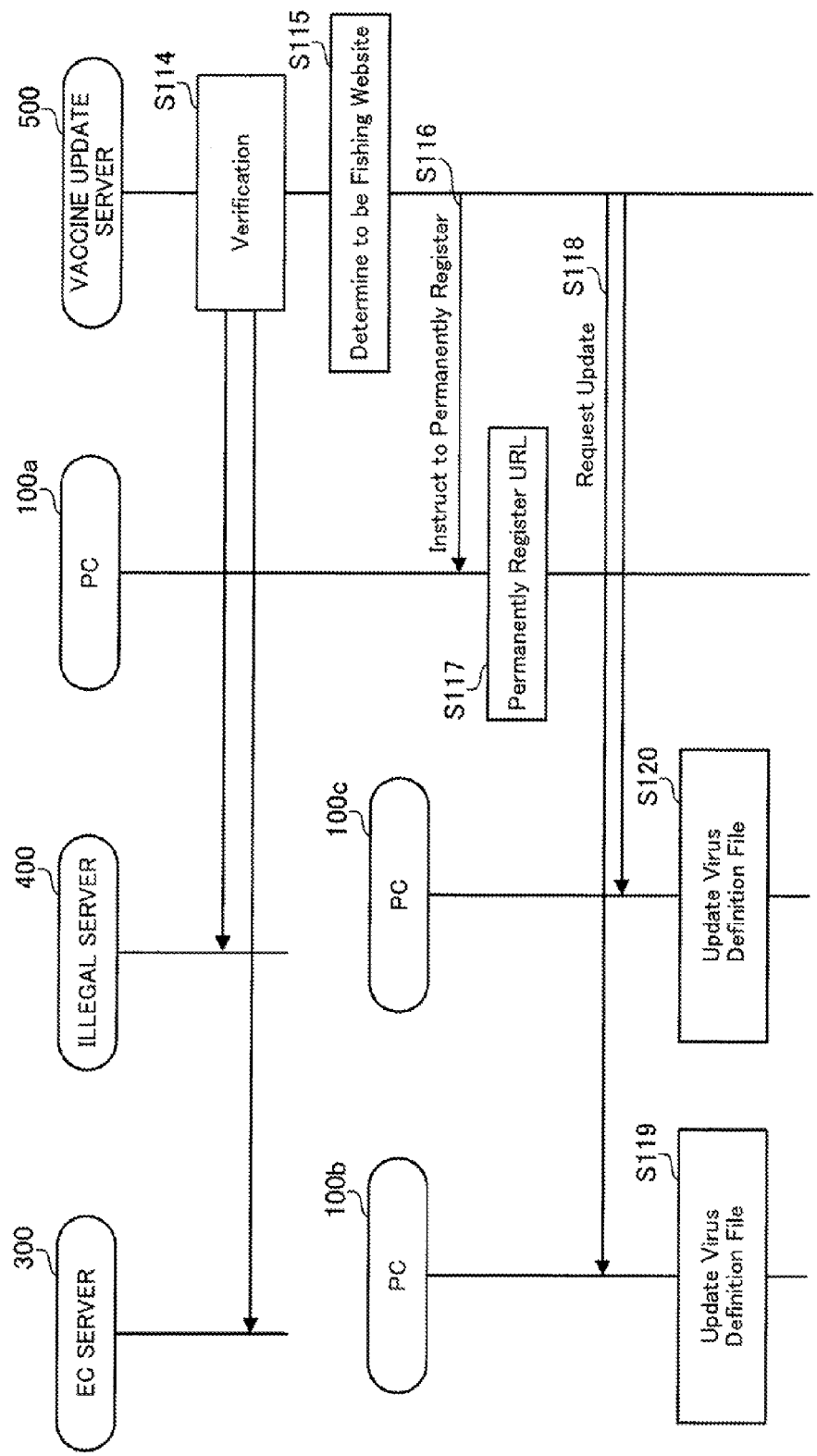
FIG. 15 indicates a second part of the sequence of processing performed when the PC accesses the EC website through the fishing website in the second embodiment.

FIGS. 14 and 15 indicate the first and second parts of a sequence of operations performed when the PC 100a accesses an EC website through a fishing website in the second embodiment.

<Step S101> The email-transmission processing unit 410 in the illegal server 400 transmits to the PC 100a a URL-notification email in which the URL of a false login webpage is indicated, and the email reception unit 121 in the PC 100*a* receives the URL-notification email.

<Step S102> The email-display control unit 122 in the PC 100*a* makes the monitor 104*a* display the URL-notification email received in step S101. When the PC 100*a* receives a manipulation of clicking on the hyperlinked URL in the displayed URL-notification email, the email-display control unit 122 requests the web-browsing processing unit 111 in the PC 100*a* to access the destination (the illegal server 400) indicated by the clicked URL. At this time, the link-manipulation detection unit 141 in the PC 100*a* detects the click on the hyperlinked URL, and the web-browsing processing unit 111 accesses the illegal server 400 in response to the request from the email-display control unit 122.

<Step S103> When the link-manipulation detection unit 141 detects a click on the hyperlinked URL, the judgment unit 143 in the PC 100*a* records the URL in the RAM 102, and makes the log recording unit 142 start recording of a log.

<Step S104> In response to the access in step S102, the customer-information reception unit 420 in the illegal server 400 makes the PC 100*a* display a false login webpage. Then, the web-browsing processing unit 111 in the PC 100*a* makes the monitor 104*a* display the false login webpage.

After the PC 100*a* receives input of a login ID and a password into input areas in the displayed login webpage, the web-browsing processing unit 111 receives a manipulation for selecting a login button in the login webpage. In response to the manipulation of selecting the login button, the web-browsing processing unit 111 transmits the inputted login ID and password to the illegal server 400.

<Step S105> The customer-information reception unit 420 in the illegal server 400 receives the login ID and the password which are transmitted from the PC 100*a*, and stores the login ID and the password in the customer-information storage unit 440. In addition, the server-access processing unit 430 in the illegal server 400 accesses the EC server 300. Then, the server-access processing unit 430 receives from the EC server 300 data for displaying a login webpage in the EC website, receives from the PC 100*a* a login ID and a password on the basis of the received data of the login webpage, transmits the received login ID and password to the EC server 300, and requests login to the EC website.

<Step S106> The service-provision processing unit 310 in the EC server 300 performs the first authentication on the basis of the login ID and the password which are received from the illegal server 400. Specifically, the service-provision processing unit 310 searches the customer DB 340 for the received login ID, extracts a password associated with the login ID searched for, and determines whether or not the extracted password is identical to the received password. When the passwords are identical, the service-provision processing unit 310 determines that the first authentication succeeds.

<Step S107> In the case where the first authentication is determined to succeed, the service-provision processing unit 310 extracts from the customer DB 340 an email address associated with the login ID searched for in step S106, and generates a confirmation URL. Then, the service-provision processing unit 310 writes the confirmation URL in the body of a confirmation email, and makes the email-transmission processing unit 320 in the EC server 300 transmit the confirmation email to the email address extracted from the customer DB 340.

<Step S108> The email reception unit 121 in the PC 100*a* receives the confirmation email, and the email-display control unit 122 in the PC 100*a* makes the monitor 104*a* display the received confirmation email. When the email-display control unit 122 receives a manipulation of clicking on the confirmation URL (which is hyperlinked) in the displayed confirmation email, the email-display control unit 122 requests the web-browsing processing unit 111 in the PC 100*a* to access the destination (the EC server 300) indicated by the clicked URL. At this time, the link-manipulation detection unit 141 in the PC 100*a* detects a click on the hyperlinked confirmation URL. The web-browsing processing unit 111 accesses the EC server 300 in response to the request from the email-display control unit 122.

<Step S109> When the service-provision processing unit 310 in the EC server 300 detects access to the confirmation URL from the PC 100*a* in a predetermined time after the transmission of the confirmation email in step S107, the service-provision processing unit 310 determines that the second authentication succeeds.

<Step S110> When the service-provision processing unit 310 determines that the second authentication succeeds, the service-provision processing unit 310 starts provision of the electronic commerce service by making the PC 100*a* (which is the source of the access) display a members webpage.

Incidentally, processing for further authentication (which is hereinafter referred to as the third authentication) may be performed between the processing for the first authentication (in step S106) and processing for the second authentication (in step S109). For example, when the service-provision processing unit 310 in the EC server 300 determines that the first authentication succeeds (in step S106), the service-provision processing unit 310 may originate a call to a telephone number which is associated with the login ID in the customer DB 340. The service-provision processing unit 310 may automatically send a sound to the opposite party, and confirm whether or not the opposite party has surely performed the manipulation for login, on the basis of the opposite party's button manipulation on a telephone set or the like. When the service-provision processing unit 310 confirms that the opposite party has surely performed the manipulation for login, the service-provision processing unit 310 may determine that the third authentication succeeds, and make the email-transmission processing unit 320 transmit the confirmation email (in step S107).

Alternatively, when the service-provision processing unit 310 determines that the first authentication succeeds (in step S106), the service-provision processing unit 310 may request the email-transmission processing unit 320 transmit an email to the email address associated with the login ID. When the EC server 300 receives an email in reply to the transmitted email, the service-provision processing unit 310 may determine that the third authentication succeeds, and make the email-transmission processing unit 320 transmit the confirmation email (in step S107).

<Step S111> When the link-manipulation detection unit 141 in the PC 100*a* detects that the hyperlinked confirmation URL has been clicked in step S108, the judgment unit 143 in the PC 100*a* determines whether or not the domain name in the confirmation URL is identical to the domain name in the URL recorded in the RAM 102 in step S103. When the domain names are not identical, the webpage as the destination in step S102 is not a webpage in the legal EC website provided by the EC server 300. In this case, the judgment unit 143 informs the access-limit control unit 144 in the PC 100*a* that a fishing website is detected, and informs the access-limit control unit 144 of the URL recorded in the RAM 102 in step S103 as the URL of the fishing website.

<Step S112> The access-limit control unit 144 transmits to the vaccine update server 500 the URL of which the access-limit control unit 144 is informed by the judgment unit 143, as well as the log information 145 recorded by the log recording unit 142.

<Step S113> The access-limit control unit 144 requests the access-limit processing unit 131 in the PC 100a to temporarily register in the virus definition file 132 the URL of which the access-limit control unit 144 is informed by the judgment unit 143. Then, the access-limit processing unit 131 temporarily registers the URL which is requested to be temporarily registered, by adding the URL to the virus definition file 132 and setting the status information associated with the added URL to "0". Thus, the access-limit processing unit 131 can immediately configure the PC 100a to stop further access to the website which is estimated as a fishing website.

In the above temporary registration, the access-limit processing unit 131 registers in the virus definition file 132, for example, only a character string from the leading bit to the domain name of the URL. Therefore, when the web-browsing processing unit 111 makes an attempt to access a destination having the same domain name, the access-limit processing unit 131 can stop the attempt to access.

For example, assume that the illegal server 400 also provides one or more false login webpages counterfeiting one or more websites other than the EC website provided by the EC server 300. In this case, the illegal server 400 disseminates the one or more URLs of the one or more other websites by using URL-notification emails. In many cases, the URLs of webpages provided by an illegal server have the same domain name. Therefore, when the domain name in the URL which is determined to indicate a fishing website as a destination is registered in the virus definition file 132, the access-limit processing unit 131 can stop the web-browsing processing unit 111 accessing the one or more false login webpages counterfeiting the one or more other websites. Thus, it is possible to prevent further theft of login IDs and passwords in the one or more other websites by the illegal server 400.

<Step S114> The reception unit 510 in the vaccine update server 500 supplies to the verification unit 520 the URL and the log information which are received from the access-limit control unit 144 in the PC 100a. Then, the verification unit 520 performs processing for supporting the work of verifying whether or not the destination indicated by the URL received from the reception unit 510 is a fishing website.

For example, the verification unit 520 makes the display device display the received log information. Then, the operator who works for verification conducts work for verification by reference to the displayed log information. For example, the operator manipulates the vaccine update server 500 for achieving member registration in the EC server 300 through the illegal server 400. Thereafter, the operator manipulates the vaccine update server 500 for accessing the destination (the illegal server 400) indicated by the URL received by the reception unit 510, and verifies whether or not operations similar to the operations performed by the PC 100a are performed. In the case where the log information, as well as the URL, is transmitted from the PC 100a to the vaccine update server 500, the efficiency and the precision of the verification can be increased. Alternatively, the verification unit 520 may automatically perform part of the operations realized by manipulation by the operator, on the basis of the log information. The part of the operations automatically performed by the verification unit 520 may include the access to the illegal server 400 and the EC server 300.

Further alternatively, the verification unit 520 may perform processing for verification which is not based on the log information. For example, the verification unit 520 transmits the URL received from the PC 100a, to a database server in which the URLs of fishing websites are recorded, and inquires whether or not the destination indicated by the transmitted URL is a fishing website.

<Step S115> When the destination indicated by the URL is determined by the verification to be a fishing website, the operator inputs into the vaccine update server 500 information on the determination by the verification. Then, the verification unit 520 receives the information on the determination, and requests the update request unit 530 to perform an operation for updating the virus definition file.

<Step S116> The update request unit 530 instructs the PC 100a (from which the URL and the log information are transmitted) to permanently register the URL which is temporarily registered in the virus definition file 132.

<Step S117> In response to the instruction from the update request unit 530 in the vaccine update server 500, the access-limit control unit 144 in the PC 100a requests the access-limit processing unit 131 to permanently register the URL added to the virus definition file 132 in step S113. Then, the access-limit processing unit 131 permanently registers the URL added to the virus definition file 132 in step S113, by changing the status information associated with the added URL from "0" to "1".

<Step S118> The update request unit 530 in the vaccine update server 500 informs the other customers' terminals (the PCs 100b and 100c in this example) in each of which the vaccine program 130 is installed, of the URL of which the vaccine update server 500 is notified by the PC 100a in step S112, and requests update of the virus definition file 132 in each customers' terminal.

<Step S119> In response to the request for the update of the virus definition file 132, the access-limit processing unit 131 in the PC 100b additionally registers the URL of which the PC 100b is informed (or the part of the URL from the leading bit to the domain name) in the virus definition file 132 stored in the HDD arranged in the PC 100b. At this time, the status information associated with the additionally registered URL is set to "1".

<Step S120> Similarly, in response to the request for the update of the virus definition file 132, the access-limit processing unit 131 in the PC 100c additionally registers the URL of which the 100c is informed (or the part of the URL from the leading bit to the domain name) in the virus definition file 132 stored in the HDD arranged in the PC 100c. At this time, the status information associated with the additionally registered URL is set to "1".

As described above, in the processing indicated in FIGS. 14 and 15, the judgment unit 143 in the PC 100a compares the domain name in the URL of the login webpage which is recorded in step S103, with the domain name in the URL indicated in the confirmation email received in step S107. When the compared domain names are not identical, the judgment unit 143 determines that the login webpage is a fishing website. Thus, the customers' terminal can determine the fishing website.

In addition, when the judgment unit 143 detects a webpage in a fishing website, the access-limit control unit 144 requests the access-limit processing unit 131 to temporarily register the URL of the webpage in the virus definition file 132 without waiting for the verification by the vaccine update server 500. Thus, it is possible to immediately forbid access to the above website. Further, since the domain name in the URL is registered when the URL is temporarily registered, it is possible to immediately prevent occurrence of theft, by the illegal server 400, of authentication information which is used for logging in to other web servers, and therefore reduce the damages to the customer who uses the PC 100a.

Further, the access-limit control unit 144 determines whether or not the URL temporarily registered in the virus definition file 132 is to be permanently registered, on the basis of the result of the verification by the vaccine update server 500. Therefore, it is possible to increase the precision in detection of the fishing website, and reduce the probability of the access-limit processing unit 131 erroneously stopping access to websites other than the fishing websites.

Figure 16:
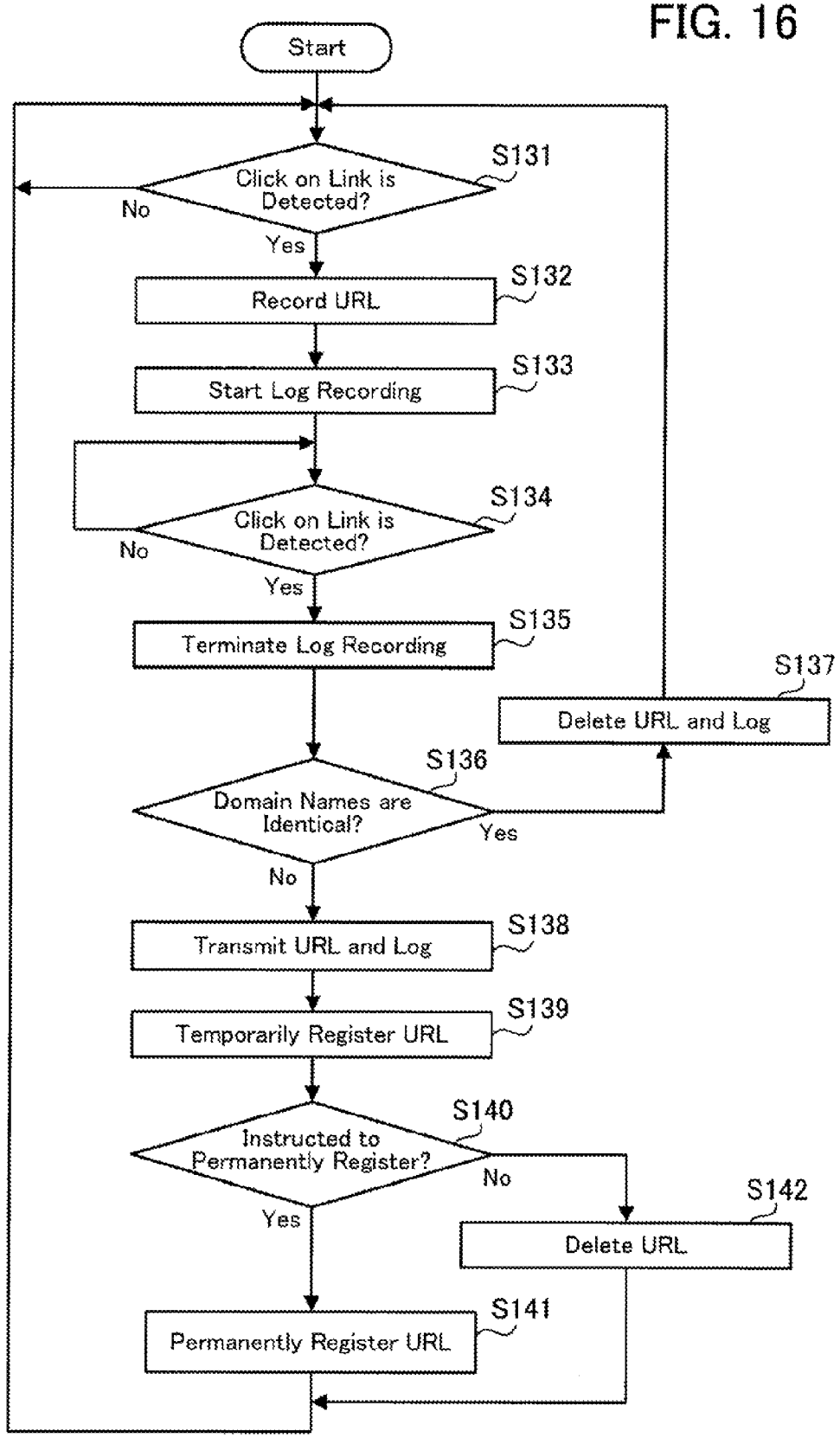
FIG. 16 indicates a flow of processing performed by the PC in accordance with a monitoring program in the second embodiment.

FIG. 16 indicates a flow of processing performed by the PC 100*a* in accordance with the monitoring program 140 in the second embodiment.

<Step S131> The link-manipulation detection unit 141 monitors the customer's manipulations for a click on a first URL which is displayed in the form of a hyperlink in a first email on the monitor 104*a* under the control of the email-display control unit 122. When the link-manipulation detection unit 141 detects a click on the first URL, the operation goes to step S132.

<Step S132> The judgment unit 143 records in the RAM 102 the URL clicked in step S131.

<Step S133> The judgment unit 143 requests the log recording unit 142 to start recording of a log. Then, the log recording unit 142 starts recording a log, which constitutes part of the log information 145.

<Step S134> The link-manipulation detection unit 141 monitors the customer's manipulations for a click on a second URL which is displayed in the form of a hyperlink in a second email displayed by the monitor 104*a* under the control of the email-display control unit 122. When the link-manipulation detection unit 141 detects a click on the second URL, the operation goes to step S135.

However, in the case where no click on the second URL is detected, for example, in a predetermined time after the click is detected in step S131, the judgment unit 143 may delete the first URL recorded in the RAM 102 in step S132, make the log recording unit 142 terminate the recording of the log, and delete the recorded log information 145.

<Step S135> The judgment unit 143 makes the log recording unit 142 complete the recording of the log.

<Step S136> The judgment unit 143 compares the domain name in the first URL recorded in the RAM 102 in step S132 with the domain name in the second URL clicked in step S134. When the first and second URLs are identical, the operation goes to step S137. When the first and second URLs are not identical, the operation goes to step S138.

<Step S137> The judgment unit 143 deletes the first URL recorded in the RAM 102 in step S132, and also deletes the recorded log information 145. Thereafter, the operation goes back to step S131.

<Step S138> The judgment unit 143 informs the access-limit control unit 144 of the first URL recorded in the RAM 102 in step S132. Then, the access-limit control unit 144 transmits to the vaccine update server 500 the first URL of which the access-limit control unit 144 is informed by the judgment unit 143 and the log information 145 recorded by the log recording unit 142.

<Step S139> The access-limit control unit 144 requests the access-limit processing unit 131 to temporarily register in the virus definition file 132 the (first) URL of which the access-limit control unit 144 is informed by the judgment unit 143. Then, the access-limit processing unit 131 temporarily registers the URL which is requested to be registered, by adding the URL (or part of the URL from the leading bit to the domain name) to the virus definition file 132, and setting the corresponding status information to "0".

Alternatively, the operations in step S139 may be performed before the operations in step S138.

<Step S140> The access-limit control unit 144 waits for an instruction from the vaccine update server 500. When the access-limit control unit 144 is instructed by the vaccine update server 500 to permanently register the temporarily registered URL, the operation goes to step S141. When the access-limit control unit 144 is instructed by the vaccine update server 500 to delete the temporarily registered URL, the operation goes to step S142.

<Step S141> The access-limit control unit 144 requests the access-limit processing unit 131 to permanently register the URL added to the virus definition file 132 in step S139. Then, the access-limit processing unit 131 permanently registers the URL temporarily registered in the virus definition file 132 in step S139 by changing the status information associated with the added URL from "0" to "1". Thereafter, the operation goes back to step S131.

<Step S142> The access-limit control unit 144 requests the access-limit processing unit 131 to delete the URL added to the virus definition file 132 in step S139. Then, the access-limit processing unit 131 deletes the URL added to the virus definition file 132 in step S139. Thereafter, the operation goes back to step S131.

3. Third Embodiment

The third embodiment is explained below. In the computer network system according to the second embodiment, each PC detects a click on a URL which indicates a login webpage and is arranged in an email. On the other hand, the computer network system according to the third embodiment is further configured to be able to determine whether or not a login webpage linked with each PC in response to a click on a hyperlink on a webpage is a fishing website.

Figure 17:
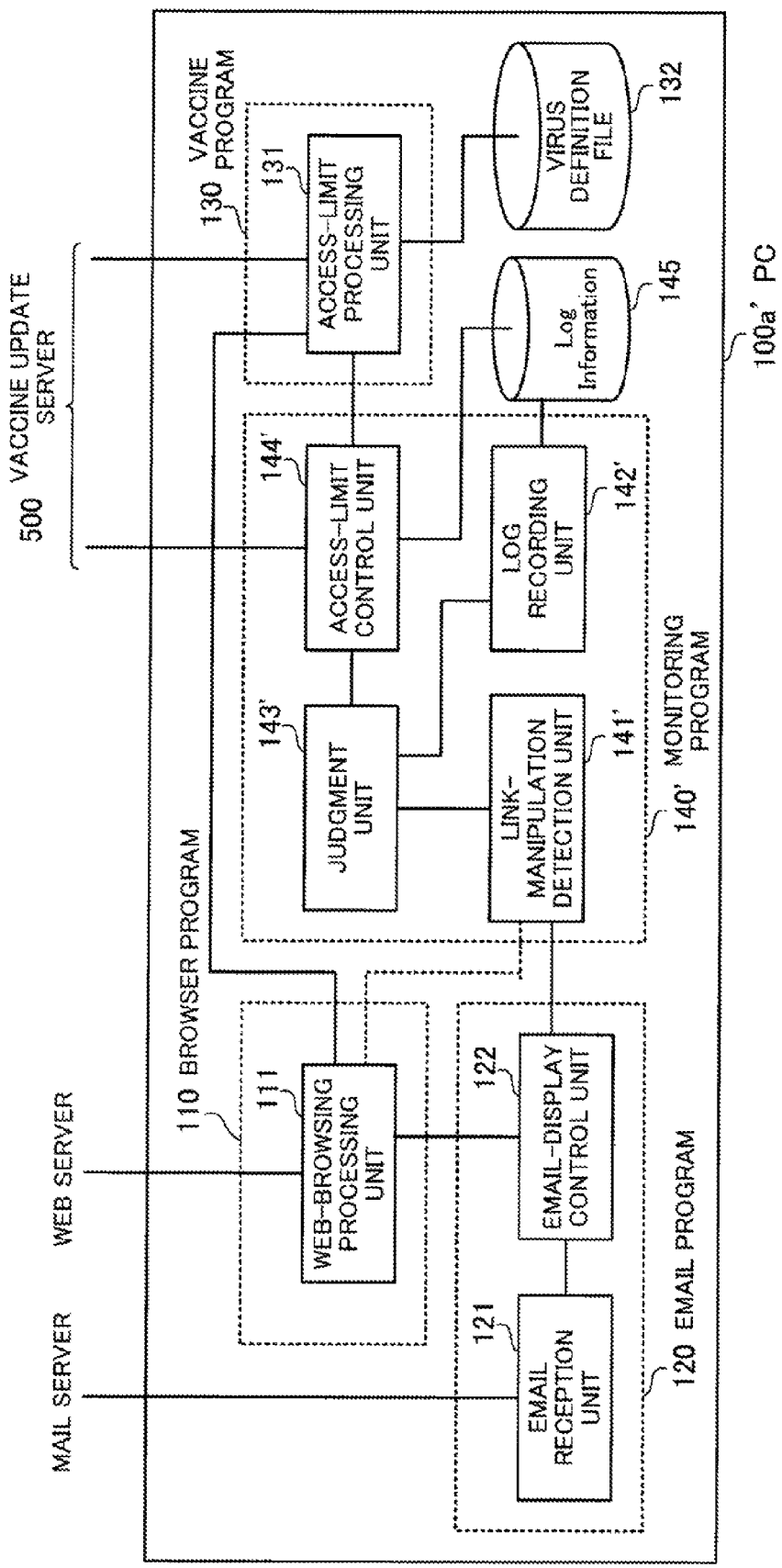
FIG. 17 illustrates examples of processing functions of a PC in a third embodiment.

FIG. 17 illustrates examples of processing functions of a PC 100*a*' in the third embodiment. In FIG. 17, constituent elements corresponding to the constituent elements in FIG. 11 bear the same reference numbers as FIG. 11.

In FIG. 17, the link-manipulation detection unit 141' in the PC 100*a*' monitors the customer's manipulations for a click on a URL in an email displayed on the monitor 104*a* by the email-display control unit 122. In addition, the link-manipulation detection unit 141' also monitors the customer's manipulations for a click on a URL in a webpage displayed on the monitor 104*a* by the web-browsing processing unit 111.

Figure 18:
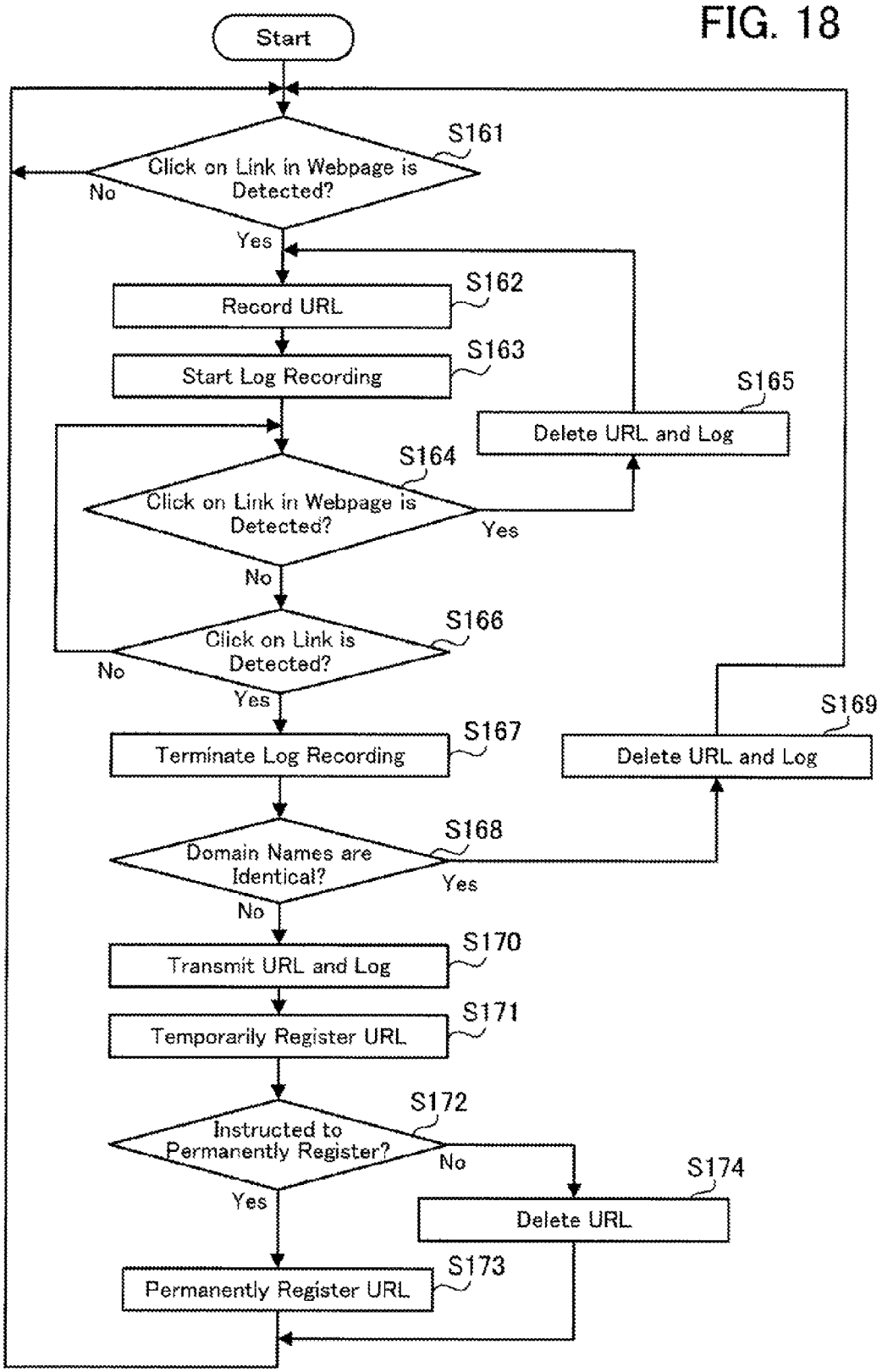
FIG. 18 indicates a flow of processing performed by the PC in accordance with a monitoring program in the third embodiment.

The link-manipulation detection unit 141', the log recording unit 142', the judgment unit 143', and the access-limit control unit 144' can perform the operations as indicated in FIG. 18, as well as the operations performed by the link-manipulation detection unit 141, the log recording unit 142, the judgment unit 143, and the access-limit control unit 144 indicated in FIG. 16.

FIG. 18 indicates a flow of processing performed by the PC 100*a*' in accordance with a monitoring program 140' in the third embodiment.

<Step S161> The link-manipulation detection unit 141' monitors the customer's manipulations for a click on a hyperlink in a first webpage displayed on the monitor 104*a* by the web-browsing processing unit 111. When a click on the hyperlink is detected by the link-manipulation detection unit 141', the operation goes to step S162. At this time, the web-browsing processing unit 111 accesses the destination associated with the clicked hyperlink, and makes the monitor 104*a* display a new webpage.

<Step S162> The judgment unit 143' records in the RAM 102 a URL associated with the hyperlink clicked in step S161.

<Step S163> The judgment unit 143' requests the log recording unit 142' to start recording of a log. Then, the log recording unit 142' starts recording a log as the log information 145.

<Step S164> The link-manipulation detection unit 141' monitors the customer's manipulations for a click on a hyperlink indicated in a second webpage displayed by the monitor 104a under the control of the web-browsing processing unit 111. In the case where no click on the hyperlink is detected in a predetermined time, the operation goes to step S166. On the other hand, when the link-manipulation detection unit 141' detects a click on the hyperlink, the operation goes to step S165.

The manipulation detected by the link-manipulation detection unit 141' in each of steps S161 and S164 is a click on a hyperlink for linking the PC 100a' to another webpage, and, for example, a click on a "transmit" button which is arranged for transmitting inputted information is not detected in each of steps S161 and S164.

<Step S165> When the hyperlink for linking the PC 100a' to another webpage is clicked in step S164, the judgment unit 143' deletes the URL recorded in the RAM 102 in step S162. In addition, the judgment unit 143' makes the log recording unit 142' terminate the recording of the log as the log information 145, and makes the log recording unit 142' delete the recorded log information 145. Thereafter, the operation goes to step S162. In the case where the operation in step S162 is performed after the operation in step S165, the URL associated with the hyperlink clicked in the preceding operation in step S164 is recorded in the RAM 102 in step S162.

In the case where the hyperlink for linking the PC 100a' to another webpage is clicked in step S164, the second webpage, which is displayed by the web-browsing processing unit 111 immediately before the operations in step S164 is started is neither a login webpage provided by the EC server 300 nor a false login webpage provided by the illegal server 400. This is because if the second webpage is a login webpage, the PC 100a' receives a confirmation email and the URL in the confirmation email is clicked before a manipulation for linking the PC 100a' to another webpage is performed. The click on the URL in the confirmation email is detected in step S166.

<Step S166> The link-manipulation detection unit 141' monitors the customer's manipulations for a click on a URL which is displayed in the form of a hyperlink in an email displayed by the monitor 104a under the control of the email-display control unit 122. In the case where no click on the URL in the above email is detected by the link-manipulation detection unit 141' in a predetermined time, the operation goes to step S164. On the other hand, when the link-manipulation detection unit 141' detects a click on the URL in the email, the operation goes to step S167.

The operations in the following steps S167 to S174 are respectively similar to the operations in steps S135 to S142 in FIG. 16.

<Step S167> The judgment unit 143' makes the log recording unit 142' complete the recording of the log.

<Step S168> The judgment unit 143' compares the domain name in the URL recorded in the RAM 102 in step S162 with the domain name in the URL clicked in step S166. When the URLs are identical, the operation goes to step S169. When the URLs are not identical, the operation goes to step S170.

<Step S169> The judgment unit 143' deletes the URL recorded in the RAM 102 in step S162, and also deletes the recorded log information 145. Thereafter, the operation goes back to step S161.

<Step S170> The judgment unit 143' informs the access-limit control unit 144' of the URL recorded in the RAM 102 in step S162. Then, the access-limit control unit 144' transmits to the vaccine update server 500 the URL of which the access-limit control unit 144' is informed by the judgment unit 143' and the log information 145 recorded by the log recording unit 142'.

<Step S171> The access-limit control unit 144' makes the access-limit processing unit 131 temporarily register in the virus definition file 132 the URL of which the access-limit control unit 144' is informed by the judgment unit 143'.

Alternatively, the operations in step S171 may be performed before the operations in step S170.

<Step S172> When the access-limit control unit 144' is instructed by the vaccine update server 500 to permanently register the temporarily registered URL, the operation goes to step S173. When the access-limit control unit 144' is instructed by the vaccine update server 500 to delete the temporarily registered URL, the operation goes to step S174.

<Step S173> The access-limit control unit 144' makes the access-limit processing unit 131 permanently register the URL added to the virus definition file 132 in step S171. Thereafter, the operation goes back to step S161.

<Step S174> The access-limit control unit 144' makes the access-limit processing unit 131 delete the URL added to the virus definition file 132 in step S171. Then, the access-limit processing unit 131 deletes the URL added to the virus definition file 132 in step S171. Thereafter, the operation goes back to step S161.

As explained above, according to the sequence of operations indicated in FIG. 18, the PC 100a' can detect that the PC 100a' is linked to a fishing website in response to a click on a hyperlink in a webpage, and the authentication information is transmitted to the illegal server 400.

4. Recording Mediums Storing Program

The processing functions according to each of the first to third embodiments can be realized by a computer. In this case, a program describing details of processing for realizing the functions according to each of the first to third embodiments is provided. When a computer executes the program describing details of processing for realizing the functions according to each of the first to third embodiments, the processing functions can be realized on the computer.

The program describing the details of the processing can be stored in a computer-readable recording medium which can be read by the computer. The computer-readable recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program according each of the first to third embodiments stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, each computer can sequentially execute processing in accordance with each portion of a program every time the portion of the program is transferred from the server computer.

5. Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions and alterations could be made hereto without departing from the spirit and scope of the invention.

What is claimed is:

1. A computer-readable, non-transitory medium encoded with a computer program to be executed by a computer, the computer program causes the computer to perform a procedure comprising:

receiving, from a server, an email containing first link information to an address associated with authentication information when the server receives the authentication information, and permits service provision through an apparatus being a source of the authentication information when the server receives access to a destination indicated by the first link information;

storing, in response to a manipulation that causes the computer to make access to a destination indicated by second link information, the second link information in a storage device of the computer;

making a display device display an input screen based on screen data which is received in response to the access to the destination indicated by the second link information;

transmitting the authentication information to an apparatus being a source of the screen data, when the authentication information is inputted into an input area arranged in the input screen;

determining whether or not the first link information is identical, in a predetermined part, to the second link information recorded in the storage device, when the computer receives the email containing the first link information and detects a manipulation of the computer for requesting access to the destination indicated by the first link information; and detecting that the second link information indicates an illegal destination, when the determining has determined that the first link information is not identical, in the predetermined part, to the second link information recorded in the storage device, and thus forbidding access to any destinations indicated by link information which is identical, in the predetermined part, to the second link information, wherein, in detection of the manipulation of the computer for requesting access to the destination indicated by the second link information, the computer detects a manipulation for selecting an indication of the second link information contained in an email received by the computer before the computer receives the email containing the first link information.

2. The computer-readable, non-transitory medium according to claim 1, wherein when the first link information is determined not to be identical, in the predetermined part, to the second link information recorded in the storage device, the procedure further comprises transmitting the second link information to a link-information collection server which is connected to the computer and collects link information, and determining, in accordance with an instruction from the link-information collection server, whether to continue setting for forbidding access to a destination indicated by link information which is identical, in the predetermined part, to the second link information.

3. The computer-readable, non-transitory medium according to claim 2, wherein the procedure further comprises recording in the storage device log information on operations performed by the computer after detection of the manipulation of the computer for requesting access to the destination indicated by the second link information until detection of the manipulation of the computer for requesting access to the destination indicated by the first link information, and transmitting the log information to the link-information collection server when the first link information is determined not to be identical, in the predetermined part, to the second link information.

4. An information processing apparatus comprising:

a memory; and one or more processors configured to perform a procedure including, receiving, from a server, an email containing first link information to an address associated with authentication information when the server receives the authentication information, and permits service provision through an apparatus being a source of the authentication information when the server receives access to a destination indicated by the first link information, storing, in response to a manipulation that causes the information processing apparatus to make access to a destination indicated by second link information, the second link information in the memory of the information processing apparatus, making a display device display an input screen based on screen data which is received in response to the access to the destination indicated by the second link information, transmitting the authentication information to an apparatus being a source of the screen data, when the authentication information is inputted into an input area arranged in the input screen, determining whether or not the first link information is identical, in a predetermined part, to the second link information recorded in the memory, when the information processing apparatus receives the email containing the first link information and detects a manipulation of the information processing apparatus for requesting access to the destination indicated by the first link information, and detecting that the second link information indicates an illegal destination, when the determining has determined that the first link information is not identical, in the predetermined part, to the second link information recorded in the memory, and thus forbidding access to any destinations indicated by link information which is identical, in the predetermined part, to the second link information, wherein in detection of the manipulation of the information processing apparatus for requesting access to the destination indicated by the second link information, the information processing apparatus detects a manipulation for selecting an indication of the second link information contained in an email received by the information processing apparatus before the information processing apparatus receives the email containing the first link information.

5. The information processing apparatus according to claim 4, wherein when the first link information is determined not to be identical, in the predetermined part, to the second link information recorded in the memory, the procedure further comprises transmitting the second link information to a link-information collection server which is connected to the information processing apparatus and collects link information, and determining, in accordance with an instruction from the link-information collection server, whether to continue setting for forbidding access to a destination indicated by link information which is identical, in the predetermined part, to the second link information recorded in the memory.

6. The information processing apparatus according to claim 5, wherein the procedure further comprises recording in the memory log information on operations performed by the information processing apparatus after detection of the manipulation of the information processing apparatus for requesting access to the destination indicated by the second link information until detection of the manipulation of the information processing apparatus for requesting access to the destination indicated by the first link information, and transmitting the log information to the link-information collection server when the first link information is determined not to be identical, in the predetermined part, to the second link information.

7. An access monitoring method executed by a computer, the access monitoring method comprising:
 receiving, from a server, an email containing first link information to an address associated with authentication information when the server receives the authentication information, and permits service provision through an apparatus being a source of the authentication information when the server receives access to a destination indicated by the first link information;
 storing, in response to a manipulation that causes the computer to make access to a destination indicated by second link information, the second link information in a memory of the computer;
 making a display device display an input screen based on screen data which is received in response to the access to the destination indicated by the second link information;
 transmitting the authentication information to an apparatus being a source of the screen data, when the authentication information is inputted into an input area arranged in the input screen;
 determining whether or not the first link information is identical, in a predetermined part, to the second link information recorded in the memory, when the computer receives the email containing the first link information and detects a manipulation of the computer for requesting access to the destination indicated by the first link information;
 detecting that the second link information indicates an illegal destination, when the determining has determined that the first link information is not identical, in the predetermined part, to the second link information recorded in the memory, and thus forbidding access to any destinations indicated by link information which is identical, in the predetermined part, to the second link information; and
 detecting a manipulation for selecting an indication of the second link information contained in an email received by the computer before the computer receives the email containing the first link information, in order to detect the manipulation of the computer for requesting access to the destination indicated by the second link information.

8. The access monitoring method according to claim 7, wherein when the first link information is determined not to be identical, in the predetermined part, to the second link information recorded in the memory, the access monitoring method further comprises transmitting the second link information to a link-information collection server which is connected to the computer and collects link information, and determining, in accordance with an instruction from the link-information collection server, whether to continue setting for forbidding access to a destination indicated by link information which is identical, in the predetermined part, to the second link information.

9. The access monitoring method according to claim 8, further comprising recording in the memory log information on operations performed by the computer after detection of the manipulation of the computer for requesting access to the destination indicated by the second link information until detection of the manipulation of the computer for requesting access to the destination indicated by the first link information, and transmitting the log information to the link-information collection server when the first link information is determined not to be identical, in the predetermined part, to the second link information.

* * * * *